United States Patent
O'Keeffe et al.

(10) Patent No.: US 9,628,256 B2
(45) Date of Patent: Apr. 18, 2017

(54) MIMO ANTENNA CALIBRATION DEVICE, INTEGRATED CIRCUIT AND METHOD FOR COMPENSATING PHASE MISMATCH

(75) Inventors: Conor O'Keeffe, Donnybrook Douglas (IE); Michael O'Brien, Youghal (IE)

(73) Assignee: Analog Devices Global, Hamilton (BM)

( * ) Notice: Subject to any disclaimer, the term of this patent is extended or adjusted under 35 U.S.C. 154(b) by 71 days.

(21) Appl. No.: 13/885,221

(22) PCT Filed: Nov. 15, 2011

(86) PCT No.: PCT/EP2011/070142
§ 371 (c)(1),
(2), (4) Date: May 14, 2013

(87) PCT Pub. No.: WO2012/065990
PCT Pub. Date: May 24, 2012

(65) Prior Publication Data
US 2013/0235962 A1    Sep. 12, 2013

(30) Foreign Application Priority Data
Nov. 17, 2010  (GB) .................................. 1019369.6

(51) Int. Cl.
*H04B 17/00*  (2015.01)
*H04L 7/00*  (2006.01)
(Continued)

(52) U.S. Cl.
CPC .......... *H04L 7/0016* (2013.01); *H01Q 3/267* (2013.01); *H04B 7/10* (2013.01); *H04B 17/12* (2015.01); *H04B 17/21* (2015.01)

(58) Field of Classification Search
CPC ......... H04B 7/10; H01Q 3/267; H04L 7/0016
(Continued)

(56) References Cited

U.S. PATENT DOCUMENTS

| 4,737,793 A | 4/1988 | Munson et al. |
| 6,262,690 B1 | 7/2001 | Malone et al. |

(Continued)

FOREIGN PATENT DOCUMENTS

| EP | 1496567 A1 | 1/2005 |
| EP | 1693922 A1 | 8/2006 |

(Continued)

OTHER PUBLICATIONS

International Search Report and Written Opinion issued in International Patent Application No. PCT/EP2011/070142 (2012).

(Continued)

*Primary Examiner* — Wesley Kim
*Assistant Examiner* — Raj Chakraborty
(74) *Attorney, Agent, or Firm* — Knobbe, Martens, Olson & Bear, LLP

(57) ABSTRACT

A multiple input multiple output (MIMO) calibration device (360) for calibrating a phase relationship between at least two signals present on at least two radio frequency (RF) paths coupling a wireless communication unit and the MIMO calibration device (360) is described. The MIMO calibration device (360) is operably coupleable via at least two RF paths between a wireless communication unit and an antenna arrangement (219). The calibration device (360) comprises a processing module (490) configured to: process a coupled amount of at least one first signal from a first path operably coupleable to a first polarization of the antenna arrangement (219) to determine at least one pilot signal from said at least one first signal; process a coupled amount of at least one second signal from a second path operably coupleable to at least one second polarization feed of antenna arrangement (219), different to the first polarization, to determine the at least one pilot signal from said at least one (Continued)

second signal; and determine a first phase relationship of the same pilot signal between the at least two RF paths.

20 Claims, 10 Drawing Sheets

(51) Int. Cl.
*H01Q 3/26* (2006.01)
*H04B 7/10* (2017.01)
*H04B 17/12* (2015.01)
*H04B 17/21* (2015.01)

(58) Field of Classification Search
USPC .................................................. 455/67.11
See application file for complete search history.

(56) References Cited

U.S. PATENT DOCUMENTS

| | | |
|---|---|---|
| 8,913,699 B2 | 12/2014 | O'Keefe et al. |
| 2002/0085643 A1 | 7/2002 | Kitchener et al. |
| 2003/0162566 A1* | 8/2003 | Shapira ............... H01Q 1/246 455/561 |
| 2004/0108963 A1 | 6/2004 | Clymer et al. |
| 2006/0018394 A1* | 1/2006 | van Zelst ............. H04B 7/04 375/260 |
| 2006/0281494 A1 | 12/2006 | Wilson et al. |
| 2008/0117959 A1* | 5/2008 | Subrahmanya .......... H04B 1/71 375/224 |
| 2008/0153433 A1* | 6/2008 | Pallonen ................ H03F 3/211 455/90.2 |
| 2008/0207240 A1* | 8/2008 | Rofougaran ........... H04B 17/21 455/517 |
| 2010/0020857 A1* | 1/2010 | Takano ................. H04B 17/21 375/219 |
| 2010/0046421 A1* | 2/2010 | Adams .................... H04B 7/10 370/316 |
| 2011/0122962 A1* | 5/2011 | De Pasquale .......... H01Q 3/267 375/267 |

FOREIGN PATENT DOCUMENTS

| | | |
|---|---|---|
| EP | 2282414 A2 | 2/2011 |
| GB | 2467773 A | 8/2010 |
| GB | 2476252 | 10/2012 |
| WO | WO 2010/092082 A1 | 8/2010 |
| WO | WO 2011/005162 A1 | 1/2011 |

OTHER PUBLICATIONS

Liu et al., "OFDM-MIMO WLAN AP front-end gain and phase mismatch calibration," *Radio and Wireless Conference 2004, IEEE* Atlanta, GA, pp. 151-154 (2004).
Search Report issued in the United Kingdom under Application No. GB1019369.6 (2011).

* cited by examiner

MIMO ANTENNA CALIBRATION DEVICE, INTEGRATED CIRCUIT AND METHOD FOR COMPENSATING PHASE MISMATCH

CROSS REFERENCE TO RELATED APPLICATIONS

This application is a U.S. nationalization under 35 U.S.C. §371 of International Application No. PCT/EP2011/070142, filed Nov. 15, 2011, which claims priority to United Kingdom Application No. 1019369.6, filed Nov. 17, 2010. The disclosures set forth in the referenced applications are incorporated herein by reference in their entireties.

FIELD OF THE INVENTION

The field of the invention relates to an apparatus and a method for calibrating a phase relationship and compensating for phase mismatch on feeds to an antenna arrangement and, in particular an apparatus and method for calibrating and compensating phase mismatch to control radiated signal polarisation.

BACKGROUND OF THE INVENTION

Conventional antenna arrays, as used in cellular infrastructure macro cells, comprising multiple antenna elements and used with existing Node-B equipment in most third generation (3G) installations, utilise a fixed 65° beam pattern. Outside of the main lobe of the antenna beam the signals are spatially filtered and significantly attenuated. Conventional network planning and passive antenna array solutions process all incoming signals with a common fixed beam pattern. Such receive processing, based on signals received within the geographic area identified by the antenna beam main lobe, referred to as the RF footprint, tends to dictate a corresponding common beam pattern for transmitter operation. Thus, an identical radio frequency (RF) footprint is used for both receive (Rx) and transmit (Tx) operation.

HSPA+, also known as Evolved High-Speed Packet Access is a wireless broadband standard defined in 3GPP release 7 and is an evolution of the third generation (3G) cellular communication standard based on frequency division duplex (FDD) wideband code division multiple access (WCDMA) technology. HSPA+ provides HSPA data rates up to 56 Mbit/s on the downlink and 22 Mbit/s on the uplink employing multiple input and multiple output (MIMO) and high order modulation (64QAM) schemes. Recent trials in HSPA+ networks have uncovered a problem with capacity and coverage issues with single antenna UE (User Equipment) devices. The intention of HSPA+ is that it should be backward compatible to all network UEs including those supporting just HSDPA and Release 99 versions of the 3G standard. HSPA+ introduces and utilises transmit diversity on the Node-B network element.

Network Operators prefer to use polarisation diversity for MIMO transmission on HSPA+, such that MIMO signals share the same frequency but different data is modulated on to respective carriers as transmitted over different polarisations. Polarisation diversity is preferred over spatial diversity as the antenna can be used at the top of the antenna mast, as for previous versions of the 3G standard. Furthermore, many sites are crowded and room for extra antennae is not available. Field trial results have also shown that the equivalent or better MIMO link gains can be found through use of polarisation diversity only.

Network operators and 3GPP standards now intend to use a primary common pilot channel (P-CPICH) on one of the virtual antenna mapped transmissions and a secondary CPICH (S-CPICH) on the other. CPICH is used by UE devices in the rake receiver for both the channel equalisation and rake receiver channel estimator. In the absence of a CPICH, for example if it is not transmitted from the node-B, alternate equalisation and rake receiver channel estimator techniques may be employed. Usually an algorithm such as a minimum mean square error (MMSE) algorithm is used to estimate the weights and delays of the Rake receiver in WCDMA based receptions without the CPICH being present.

Many current UEs, will not support new upgrades to the 3G standard and are therefore unable to utilise HSPA+. In particular, recent trials of HSPA+ networks have uncovered a problem due to a use of linear polarisation (LP) transmission diversity and its effects on 3G UE devices that do not have the capability of diversity reception. A UE device supporting only older versions of the standard may only have one receive antenna and, thus, will not be able to exploit the transmission diversity of the upgraded network. Such a UE device will obtain its call traffic routed through one of the node B transmit diversity paths only. A problem arises as the LP antenna UE device is rotated or moved to a location where the second orthogonal transmission from the MIMO enabled Node B becomes much stronger than the desired first orthogonal transmission. This second orthogonal transmission signal then exhibits itself as an uncorrelated noise-like interferer on the UE receiver receiving the first orthogonal transmission. Furthermore, the second orthogonal transmission signal remains as an uncorrelated interferer as such a UE device is not able to process both MIMO transmissions at the same time. The received carrier to interference plus noise ratio (CINR) may degrade the receiver performance by 10's of dBs, thereby causing communication links to be dropped and consequently reducing cell coverage area.

If the MIMO transmission is left-hand circularly polarised (LHCP) and right-hand circularly polarised (RHCP), as opposed to LP +45° and LP −45° polarisation, then the impact on legacy 3G UE devices is reduced. This is because the signal to interference due to the second MIMO carrier is substantially limited to 3 dB, i.e. the signal of both LHCP and RHCP are the same power for all orientations of the UE device antenna. Thus, HSPA+ enabled UE devices do not have their reception adversely affected by use of a CP signal.

Since orthogonal LHCP and RHCP antennas for MIMO (Multiple Input Multiple Output) transmission in network trials has proven to be successful in reducing this problem with single antenna UE devices, this implies that an antenna for the node B must be capable of concurrent transmission in LHCP and RHCP for virtual antenna mapped signals.

The HSPA+ protocol is currently being designed to support a technique known as Virtual Antenna Mapping (VAM). This technique was originally intended to help with equalising the power payload for both transmitters delivering the MIMO signals to the sector. VAM in the version 7, Release 2010 of the HSPA+ standard limits the precoding values of the virtual antenna mapping. These precoding values are equivalent to performing a 90° phase shift to one path in the digital domain, with a similar effect to that of placing a 90° 3 dB hybrid coupler in the RF domain paths.

Referring now to FIG. 1, examples of known electromagnetic waveforms are illustrated. A first diagram 100 illustrates a linear polarised field from an antenna and a second diagram 150 illustrates a circular polarised field. The polarization of an antenna is the orientation of the electric fields (E-plane) 110 of the radio wave with respect to the Earth's surface and is largely determined by the physical structure of the antenna and by its orientation. The magnetic field (H-plane) 120 is always perpendicular to the E-plane 110. The E-plane 110 and H-plane 120 are respectively illustrated as propagating in the directions 105, 115. In contrast, circular polarised (CP) antennas as illustrated in the second diagram 150 have a rotating E-plane 160 in a propagation direction 155, in contrast to the linear polarised (LP) antennas having a fixed E-plane.

Circular polarisation is the polarisation of electromagnetic radiation, such that the tip of the electric field vector describes a circle in any fixed plane intersecting, and normal to, the direction of propagation. However, in practical systems there will be minor deviations from this perfect angular electric field vector that describes a circle. For the purposes of the description hereinafter described an E-Field vector that is substantially close to that of a circle is considered to be a circularly polarised field.

Elliptical polarisation is the polarisation of electromagnetic radiation, such that the tip of the electric field vector describes an ellipse in any fixed plane intersecting, and normal to, the direction of propagation. Elliptical polarised fields can be configured as circularly polarised fields, and can be rotated polarised fields in a clockwise or counter clockwise direction as the field propagates; e.g. forming right hand elliptical polarisation and left hand elliptical polarisation respectively. An elliptically radiated field will have substantially changed magnitude for 90° change in angular vector.

Cross-polarisation (XPOL) antennas are also often used, particularly in cellular infrastructure deployments. XPOL antenna technology utilises pairs of two LP antenna elements that are orientated substantially 90° with respect to each other, often referred to as being 'orthogonal' to each other, usually at +45° and −45° polarisation. These pairs are often elements in an array, and thus can be arranged such that a desired propagation beam shape is developed. To date, deployed cellular infrastructure transmit polarisation orientation predominantly only uses one of the polarisation types whereas receive functionality is performed in both polarisations, with separate and independent processing of the two XPOL receive paths being employed. These XPOL antennas can be of patch construction (PCB) or of Dipole (Wire) construction. Currently, some Network Operators are supporting HSPA+ using two polarisations for the transmission of MIMO signals.

A known problem in using LP transmissions is that the polarisation of the transmitted signal antenna and the receiving signal antenna (if also an LP type) needs to have the angle of polarisation exactly the same for reception of the strongest signal. For example a signal transmitted on a vertically polarised (VP) antenna and received on an antenna with horizontal polarised (HP) may have 10's of dB difference in received power compared to a matched VP antenna. Mobile handset antennas are generally LP, though increasingly through means of diversity reception paths a second polarisation diversity LP antenna is utilised, orthogonally polarised to the first.

However, all existing antenna infrastructure is of a linear cross-polarisation type. There is a need to convert signals being fed to a cross polarisation (XPOL) antenna and modify them such that they can be broadcast in CP modes using existing antenna infrastructure. A CP signal can be generated in a XPOL LP antenna arrangement by splitting the power in two and adding a 90° phase rotation to one of the paths with respect to the other. In order for a signal to be transmitted as a CP signal the 90° phase relationship has to be maintained from baseband right through to the antenna elements. CP polarisation is sensitive to the phase difference between the signals at the radiating elements. This correction can be compensated for in the RF domain or in the baseband processing domain. In the RF domain the 90° phase rotation to one of the paths is often achieved with a 3 dB hybrid coupler. Internal feeds to XPOL elements of respective +45° and −45° polarisation are not specified or controlled to be matched electrical lengths on existing antennae. Furthermore, cable feeds from the base station or remote radio head to the antenna are typically cut to measure and installed in the field. Consequently, a phase relationship of signals applied to the orthogonal antenna elements is unknown.

Where XPOL LP antennas are used to radiate CP signals the phase to the antenna elements needs to be tightly controlled. As a polarised signal may deviate from its ideal 90° difference, then the polarisation diversity benefits deteriorate quickly to an elliptical type polarisation, thus greatly affecting the performance of communications in the network. The resultant phase imbalance may be accumulated at multiple sources, which include for example, cable feeds, transmitter chains, phase locked loops (PLLs), duplexers, etc. Thus, the phase at the output of the base station/Node-B is not controlled. Normally there will be a non-deterministic phase offset at output ports due to process variation, temperature profile, carrier frequency and initial conditions, etc. at a power-on of internal components of the base station/Node-B. Where Virtual Antenna Mapping is used, these phase offset sources will cause the phase of the signals presented to the MIMO calibration unit to be non-deterministic and to change due to environmental conditions.

Simple measurement and phase adjustment techniques cannot be used to correct for the above problems, as the termination of the antenna feeds affecting the signal paths is actually made inside the antenna array, i.e. at the radiating elements, and these can not be accessed in an electrical type test. Furthermore, the phase shift may be frequency dependant, especially if there is significant mismatch in cable lengths. In laboratory tests, it has also been found that a difference in torque applied to the cable connectors has a significant impact on the phase response, which can be as much as seven degrees per connector. Thus, any measurements performed prior to installation are insufficient to accurately set phase shift circuitry in the network element prior to the antenna/antenna array. Also, for the above reasons a use of a single phase setting is incapable of guaranteeing an accurate phase of polarisation signals from the antenna/antenna array. Furthermore, offsets due to environmental changes cannot be compensated for in an electrical test before installation.

To date no known solution has been developed to determine, or correct for, a phase mismatch of signals coming from an antenna on respective MIMO feeds right through to translation of signals of orthogonal components on the transmission path. Furthermore, there is no known proposal to adjust VAM generated signals, for example when applied to HSPA+ networks.

U.S. Pat. No. 4,737,793 discloses a microstrip-based XPOL antenna element with two 3 dB hybrid couplers and four radio frequency phase shifters. There is no mention of any adjustment of the phase shifter for the purpose of offsetting mismatch in cable feeds. U.S. Pat. No. 4,737,793 provides no teaching of either a calibration method or a feedback technique, for example using feedback couplers for sensing and updating the phase shifter settings. Furthermore, the use of excessive processing on the signals at the antenna is undesirable, as the losses induced would be excessive and cause noise figure degradation of the receiver performance and an unacceptable loss on the PA output for transmission. In addition, the teaching of U.S. Pat. No. 4,737,793 does not propose any exploitation of VAM aspects of the air interface protocol layer to determine phase mismatch.

U.S. Pat. No. 6,262,690 proposes a use of a hybrid coupler and a phase shifter at the input to an amplifier pair to adjust a phase of a signal fed to a single antenna element via an orthomode transducer, which is a device that separates signals received from an antenna into their respective received polarisation types. The phase shifters are employed to correct for phase offsets induced by the amplifiers. In addition, U.S. Pat. No. 6,262,690 does not propose any exploitation of VAM aspects of the air interface protocol layer to determine phase mismatch.

Furthermore, receiver examples using active panel antenna technology, as exemplified by co-pending application GB0921956.9, utilise a receiver to calibrate and compensate for any phase mismatch between respective antenna feeds of different polarisations to an antenna array. In such examples, the compensation mechanism has to refer back to altering the transmission signal in the digital domain, which is not always possible particularly where the antenna element is physically far removed from the baseband signal generation, which is typically the case in most Node B equipment.

Consequently, current techniques are suboptimal. Hence, an improved mechanism to address the problem of supporting antenna array technology in a wireless communication network would be advantageous.

SUMMARY OF THE INVENTION

Accordingly, the invention seeks to mitigate, alleviate or eliminate one or more of the above mentioned disadvantages singly or in any combination.

According to a first aspect of the invention, a multiple input multiple output (MIMO) calibration device for calibrating a phase relationship between at least two signals present on at least two radio frequency (RF) paths coupling a wireless communication unit and the MIMO calibration device, is described. The MIMO calibration device is operably coupleable via at least two RF paths between a wireless communication unit and an antenna arrangement); wherein the calibration device comprises a processing module is configured to: process a coupled amount of at least one first signal from a first path operably coupleable to a first polarisation of the antenna arrangement to determine at least one pilot signal from said at least one first signal; process a coupled amount of at least one second signal from a second path operably coupleable to at least one second polarisation feed of antenna arrangement, different to the first polarisation, to determine the at least one pilot signal from said at least one second signal; and determine a first phase relationship of the same pilot signal between the at least two RF paths.

Advantageously, this provides a means to determine the phase difference of at least one signal component that is common to MIMO feed paths operably coupleable to an antenna arrangement, thereby allowing a means to determine a compensating phase adjustment to control the polarisations of some or all components of said signals.

In an optional embodiment, the at least one first signal may be processed by at least one from a group consisting of: a virtual antenna mapping (VAM) module, a 3 dB hybrid combiner. Advantageously, this allows for the composition of signals on each MIMO feed paths to contain signals of orthogonal polarisation types and/or ensure that the pilot signal is present in both feeds for the purpose of calibration.

In an optional embodiment, the at least one pilot signal may comprise at least one from a group consisting of: a CPICH signal, a primary signalling channel (P-SCH) signal, a secondary signalling channel (S-SCH) signal, a synchronisation signal, a tonal signal, an intermittently transmitted signal, a high speed downlink packet access signal (HSPA+). Advantageously, this allows for re-use of the inventive concept across a wide variety of technologies.

In an optional embodiment, the processing module may be configured to determine, from a P-SCH protocol signal, at least one from a group consisting of: a frame boundary, a slot boundary. Advantageously, this allows for example, a P-SCH signal to be used to determine phase, where such a signal may be known by the processing module apriori. Furthermore, in HSPA+ technology the P-SCH signal is not spread using spread spectrum techniques, such as in WCDMA, thus negating the need to employ extra spread spectrum processing modules, such as, for example, one or more rake receiver module(s).

In an optional embodiment, the at least one pilot signal may be a P-SCH signal and the MIMO calibration device may use at least one from a group consisting of: (i) a least mean square (LMS) adaptive filter to determine the phase relationship; (ii) the P-SCH as a code used for automatic frequency correction (AFC) and phase relationship determination. Advantageously, an LMS adaptive filter allows for a robust technique to determine phase relationship whereby the P-SCH can have a negative signal to noise ratio. Furthermore, the repetition of the P-SCH sequence as set by the base station can allow for the internal oscillators in the processing module to synchronise to the same, thereby negating a need for expensive high accuracy frequency reference sources in the processing module or routing to the processing module 490 from the NodeB/base station equipment. Uncorrected frequency errors between the Node-B reference sources and the processing module reference sources can have a negative impact on the determination of phase relationship detectable for the pilot signals detectable on MIMO feeds.

In an optional embodiment, the processing module may be further configured to receive and process a coupled amount of at least one first RF signal; and determine at least one second phase relationship of the same pilot signal between the at least two RF paths to the antenna arrangement (219) of the processed coupled amount of the at least one first RF signal. Advantageously, this feature allows for the processing module to further determine the phase relationship of signals between the MIMO antenna calibration device and the antenna arrangement elements of different polarisation.

In an optional embodiment, the MIMO calibration device may comprise or may be operably coupleable to at least one phase shifter module located on at least one path associated with one of the at least two RF paths such that the at least one phase shifter module is arranged to adjust a phase shift based on at least one determined phase relationship. Advantageously, this feature allows for the processing module to adjust the phase relation ship of signals on MIMO feeds, such that the desired phase relationship of signals is maintained at the antenna arrangement elements In an optional embodiment, the at least one phase shifter module may be operably coupleable to a motor such that the processing module configures the motor to adjust a phase shift ('β') to be applied by the at least one phase shifter to RF signals passing there through. The at least one phase shifter module may be located on each of the at least two RF feed paths such that the processing module adjusts a phase shift ('β') to be applied by the at least one variable phase shifter to RF signals passing through either or both of the at least two RF feed paths. Advantageously, an electromechanical phase shifter such as that actuated with a motor has no solid state circuit that processes the RF signal path, thereby reducing any potential impact of inter-modulation products that are generated to a much greater extent that when using solid state circuits.

In an optional embodiment, at least one determined phase relationship may be communicated to another network element to control an incoming phase relationship of the at least one pilot signal determined from at least one first signal and at least one second signal on respective polarisation feeds of the antenna arrangement. Advantageously, this allows more than one MIMO carrier frequency to be adjusted since the adjustment can be tailored to the different carrier frequency. Furthermore, the need for a phase shifter may be negated from the MIMO antenna calibration device, thereby advantageously reducing device insertion loss and component cost.

In an optional embodiment, the VAM module may comprise a plurality of cross-coupled complex multipliers and summation modules capable of changing a phase of at least one signal operably coupleable to at least one polarisation feed to antenna arrangement based on at least one determined phase relationship. Advantageously, this allows for the VAM module to adjust for a desired phase relationship, as determined by the MIMO antenna calibration device, thereby negating or reducing a need for the phase shifter functionality in the MIMO antenna calibration device. Furthermore, controlling the phase at such a point may eliminate any insertion loss associated with controlling the phase in the analogue/RF domain. In addition, corrections may be performed on a per carrier basis, thereby allowing correction of more than one carrier frequency per MIMO antenna feed. Since the signals are adjusted digitally, such adjustments may be effected to a high accuracy and may be immune to process or environmental variations that may impact, for example, solid state implementations of a phase shifter.

In an optional embodiment, the MIMO calibration device may comprise or be operably coupleable to a scanner for performing a scanning operation to determine a carrier frequency of the at least first signal and the at least one second signal by sequentially processing a coupled amount of predefined spectrum to determine a presence of the at least one pilot signal on first path and the second path for the same carrier frequency. Advantageously, such a feature may negate a need of the Node-B or the OMC to instruct each MIMO antenna calibration device as to which carrier frequency it performs phase relationship detection on.

In an optional embodiment, the processing module is configured to perform a real-time determination of the at least one phase relationship. Advantageously, such a feature may allow a determination of phase relationship of respective signals to happen in a timely manner, thereby allowing a dynamic update on compensating the phase shifter(s).

In an optional embodiment, the MIMO calibration device further comprises a memory included within or coupled to the processing module and configured to store data samples to determine at least the first phase relationship in subsequent processing. Advantageously, such a feature may facilitate more reuse of digital signal processing hardware in processing module, thus reducing the hardware complexity.

In an optional embodiment, the MIMO calibration device may be located in at least one from a group consisting of: in the wireless communication unit, in antenna housing, between the wireless communication unit and the antenna such as at an antenna mast or at an antenna tower top. Advantageously, such a feature may facilitate the MIMO antenna calibration device to be integrated with other network elements or integrated atop the mast collocated with other network elements.

In an optional embodiment, the MIMO calibration device may comprise a feedback path configured to provide at least one determined phase relationship of the same pilot signal between the at least two RF paths to the wireless communication unit, for example to provide the at least one determined phase relationship to the wireless communication unit over at least one from a group consisting of: an AISG interface, an air interface. Advantageously, such a feature may utilise one of the already existing interfaces present or being processed by the processing module to communicate updates to other network elements.

In an optional embodiment, the processing module may be further arranged to use a first representation of the at least one pilot signal as a reference signal to mitigate mismatch error on the second representation of the at least one pilot signal. Advantageously, such a feature may allow for mismatches associated with receivers within the processing module to be substantially immune from contributing to phase relationship determination of pilot signals present on MIMO feeds operably coupled to the antenna arrangement and other network elements.

In an optional embodiment, the wireless communication unit may be one from a group consisting of: a base station, a NodeB, an eNodeB, a wireless subscriber communication unit. Advantageously, such a feature may allow for the technique to be accommodated across a variety of classes of communication equipment In an optional embodiment, the processing module may be further configured to determine the first phase relationship of the same pilot signal between the at least two RF paths between a baseband portion of the wireless communication unit and the MIMO calibration device; determine a second phase relationship between the MIMO calibration device and the antenna; and determine at least one composite phase correction value based on the first and second determination. Advantageously, such a feature may allow for the at least two phase determinations to be used to determine a phase compensation phase shift value, thereby maintaining a controlled phase relationship between the MIMO source of the pilot signals and the pilot signal as presented to elements of orthogonal polarisation in the antenna arrangement.

In an optional embodiment, the MIMO calibration device may be configured for use on at least one from a group consisting of: a HSPA+ network an LTE network, a WiMax, a WiFi or micro cellular network, a pico cellular network; a macro cellular network. Advantageously, such a feature may allow for the examples of the invention to be used across a variety of classification of base stations/Node-Bs as well as variations in air interface protocol employed by such base stations/Node-Bs.

According to a second aspect of the invention, an integrated circuit for a multiple input multiple output (MIMO) calibration device for calibrating a phase relationship between at least two signals present on at least two radio frequency (RF) paths coupling a wireless communication unit and the MIMO calibration device, is described. The MIMO calibration device is operably coupleable via at least two RF paths between a wireless communication unit and an antenna arrangement); wherein the calibration device comprises a processing module is configured to: process a coupled amount of at least one first signal from a first path operably coupleable to a first polarisation of the antenna arrangement to determine at least one pilot signal from said at least one first signal; process a coupled amount of at least one second signal from a second path operably coupleable to at least one second polarisation feed of antenna arrangement, different to the first polarisation, to determine the at least one pilot signal from said at least one second signal; and determine a first phase relationship of the same pilot signal between the at least two RF paths.

According to a third aspect of the invention, a method for calibrating a phase relationship between two signal paths by a MIMO calibration device that is operably coupleable via at least two radio frequency (RF) paths between a wireless communication unit and an antenna arrangement. The method comprises processing a coupled amount of at least one first signal from a first path operably coupleable to a first polarisation of the antenna arrangement to determine at least one pilot signal from said at least one first signal; processing a coupled amount of at least one second signal from a second path operably coupleable to at least one second polarisation feed of antenna arrangement, different to the first polarisation, to determine the at least one pilot signal from said at least one second signal; and determining a first phase relationship of the same pilot signal between the at least two RF paths.

According to a fourth aspect of the invention, a tangible computer program product comprising executable program code stored therein for calibrating a phase relationship between two signal paths, is described. The executable program code is operable for performing the method of the third aspect of the invention.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EXAMPLE EMBODIMENTS OF THE INVENTION

Figure 1:
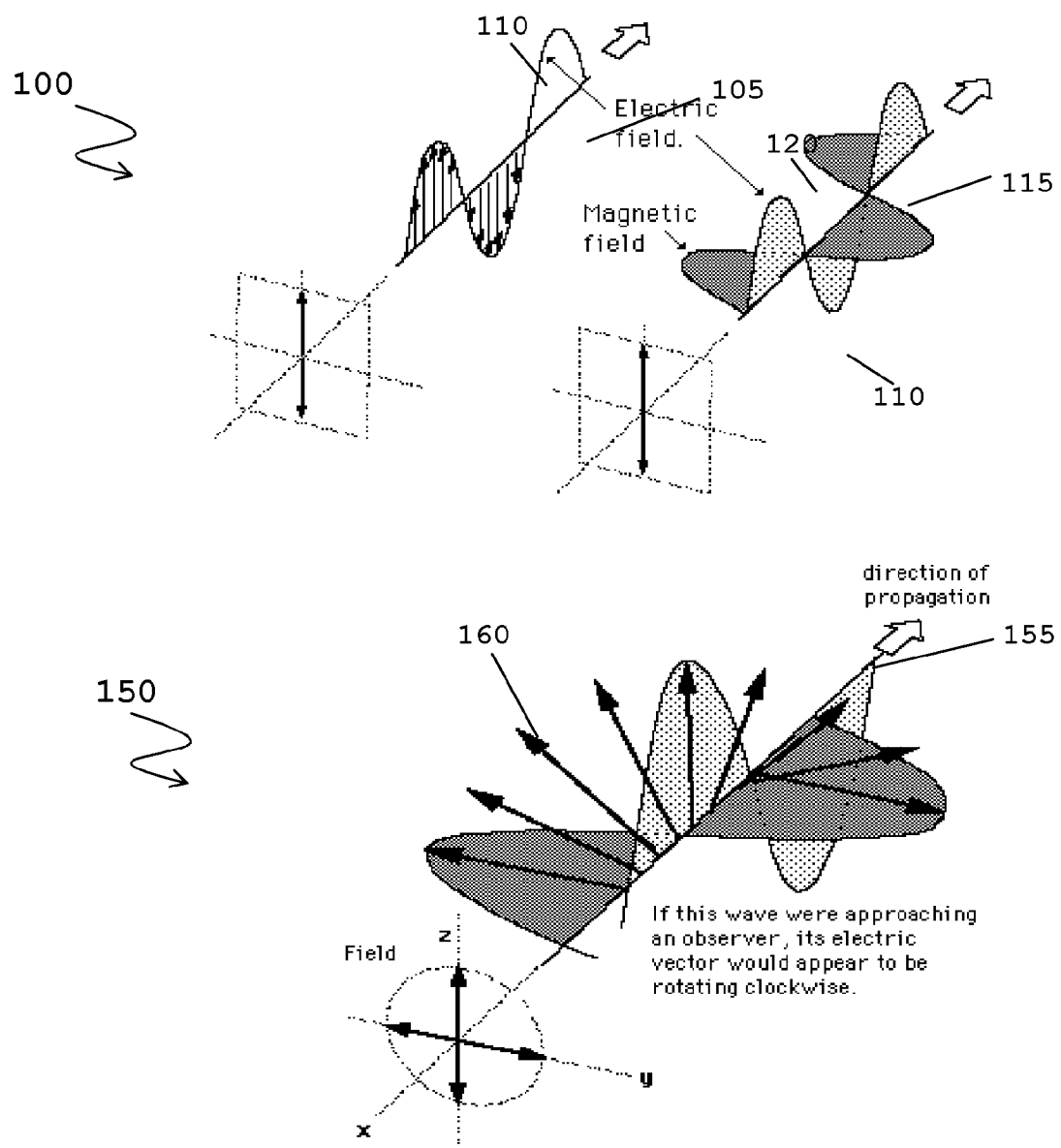
FIG. 1 shows electromagnetic waveforms illustrating a linear polarized field and a circular polarized field.

In the described examples, a reference to a native polarisation of an antenna encompasses the polarisation of a signal processed by one antenna element acting independently of at least one other antenna element. In the XPOL (cross polarisation) example cited heretofore the native polarisation would be LP (linear Polarised) +45° and LP −45°. Independent signals processed by these antenna elements will undergo no polarisation transformation. When a modified version of the same signal is processed concurrently in antenna elements of both polarisations, and through combining forms a different polarisation type, then this is referred to as non-native.

The term 'MIMO', as defined herein, encompasses a multiple input multiple output communications system where at least two spatially or polarization diverse antennas for both receive and transmit are used on at least one end of a communications link.

It is well known that the cable feed between an antenna array and a NodeB will affect the phase of transmitted/received signals. In a majority of implementation scenarios, this issue is normally unimportant. Antenna arrays, when implemented as passive networks, need to be able to accurately control phase and amplitude between respective antenna elements of a common polarisation. There is generally no desire to match elements of orthogonal polarisation. However, multiple in/multiple out (MIMO)-based polarisation transmission is a relatively new phenomena in wireless communication. This issue, combined with the fact that legacy (non-MIMO) handsets need to be supported, the mechanism described herein calibrates the phase difference/phase mismatch between the two antenna cable feeds from the antenna elements through to the digital baseband VAM stage or to, for example, a 3 dB Hybrid coupler.

In some examples, this calibration is formulated in two stages. A first stage comprises the calibration from the antenna elements to the polarisation control device and a second stage comprises calibration from the polarisation control device to the digital signal processing of the NodeB/base station. Once the phase mismatch between the two feeds has been determined, a technique is proposed that controls at least one adaptive phase shifter to adjust a phase shift of at least one antenna feed path.

In a further exemplary embodiment, the polarisation control device provides a feedback signal to the NodeB/base station equipment to adjust precoded variables in the virtual antenna mapping (VAM) processing within the NodeB/base station following the determination of the composite phase mismatch from the values from the MIMO Calibration device described herein.

The MIMO calibration/polarisation control device determines the phase mismatch on the input feed cables by determining the phase relationship of a signal that is common in both physical antenna feeds.

Modern air-interface protocols exploit antenna diversity to improve the air interface communication link. Thus, conventional antenna arrangements, and particularly antenna arrays contain an array of radiative antenna elements of for example +45° and −45° LP orthogonal polarisation.

In network element-to-antenna array configurations it is known that the cable feed between an antenna array and a NodeB will affect the phase of transmitted/received signals. Where an antenna is transmitting or receiving with its native polarisation, such a cable feed phase issue has previously been deemed to be relatively unimportant, as there is generally no desire to match elements of orthogonal polarisation. In passive antenna array systems with elements of a common polarisation, the phase and amplitude of paths/signals should be accurately controlled to individual elements of the array via the antenna array's corporate feed network in order to control the beam of a radiated signal. Passive antenna arrays, such as those deployed in cellular infrastructure, use this method (or similar methods) of control to generate a desired beam of required polarisation. There is generally not a need to match the corporate feed network on one polarisation with that in the orthogonal, where native polarisations only are processed.

Example embodiments of the invention utilise one or more receivers and associated processing functionality to sense signals in a calibration process to compensate for any phase mismatch between or due to cable feeds from a NodeB/base station to a network control apparatus, hereinafter referred to as MIMO calibration device. In one example, signal processing of signals to be applied to a VAM function enabled in an eNodeB is performed. Examples herein described determine an input phase mismatch on signals to the MIMO calibration device as well as resolving and correcting for the output phase mismatch from the polarisation control device to the antenna.

Furthermore, a MIMO calibration device is described, which when configured to be part of the interconnect path between the output of a NodeB and an antenna arrangement may provide a phase modification to transmit or receive signals there between, and in particular between the NodeB and the MIMO calibration device. In addition, the polarisation control device may be configured to adjust for phase mismatch, in order to generate at least one non-native polarisation type. In some examples, a portion of signals relayed between the antenna array and a NodeB are coupled off and routed to down-conversion and signal processing circuitry, processed digitally in one example in order to provide a determination of an adjustment signal for controlling a phase shift of one or more of the paths of a variable phase shifter located between the antenna array and the NodeB, for example located in the MIMO calibration device.

In some example embodiments, the variable phase shifter may be replaced by any RF element that is able to apply a phase adjustment to a signal passing there through. In some examples, the one or more adjustable phase shifter(s) are controlled/adjusted dependent upon the frequency being transmitted or received, to provide compensation for different phase shifts as a function of frequency In one example for the calibration of the antenna elements to the MIMO calibration device 360, calibration of any phase mismatch determination is based on a use of a known polarisation source; for example a vertical polarisation (VP) source; of a two-tone signal being applied via a remote antenna. For example if the cable and corporate feed network to the MIMO calibration device 360 were perfectly matched, a 180° phase shift signal would exist, as observed at the output of the cable feeds at the antenna array and prior to a 3 dB hybrid function with a VP source and a +45° and −45° LP orthogonal polarization network antenna arrangement. In one example, this calibration result may formulate part of the total determination of phase shift required to ensure a desired polarisation may be transmitted from the antenna arrangement.

Since example embodiments of the invention for the calibration of the antenna elements to the MIMO calibration device 360 can relate to any orthogonally polarised antenna arrangement, examples of the invention are equally relevant to UE or any handset receiver device.

The following description focuses on embodiments of the invention that are applicable to active antenna arrays employed in Universal Mobile Telecommunication System (UMTS) cellular communication systems and in particular to a UMTS™ Terrestrial Radio Access Network (UTRAN) operating in a $3^{rd}$ generation partnership project (3GPP™) system, and evolutions to this standard such as HSPA+. However, it will be appreciated that the invention is not limited to this particular cellular communication system, but may be applied to any wireless communication system, including satellite communication systems, employing antenna arrangements, where at least one orthogonal pair of antenna elements are used.

In the examples herein described, an antenna element is a radiative structure whose purpose is to convert electromagnetic (EM) signals to electrical signals, or vice versa, in which a singular element has a fixed radiation pattern. The term 'radiative elements' described herein refers to elements capable of radiating an electromagnetic signal. Furthermore, the term 'radiative elements' described herein also encompasses structures capable of absorbing EM radiation and converting to electrical signals. These elements, constructed as an array can be configured to have various radiation patterns or polarisations by manipulation of electrical signals coupled to the elements. Thus, the ability to alter the radiative beam shape or polarisation may be achieved.

Figure 2:
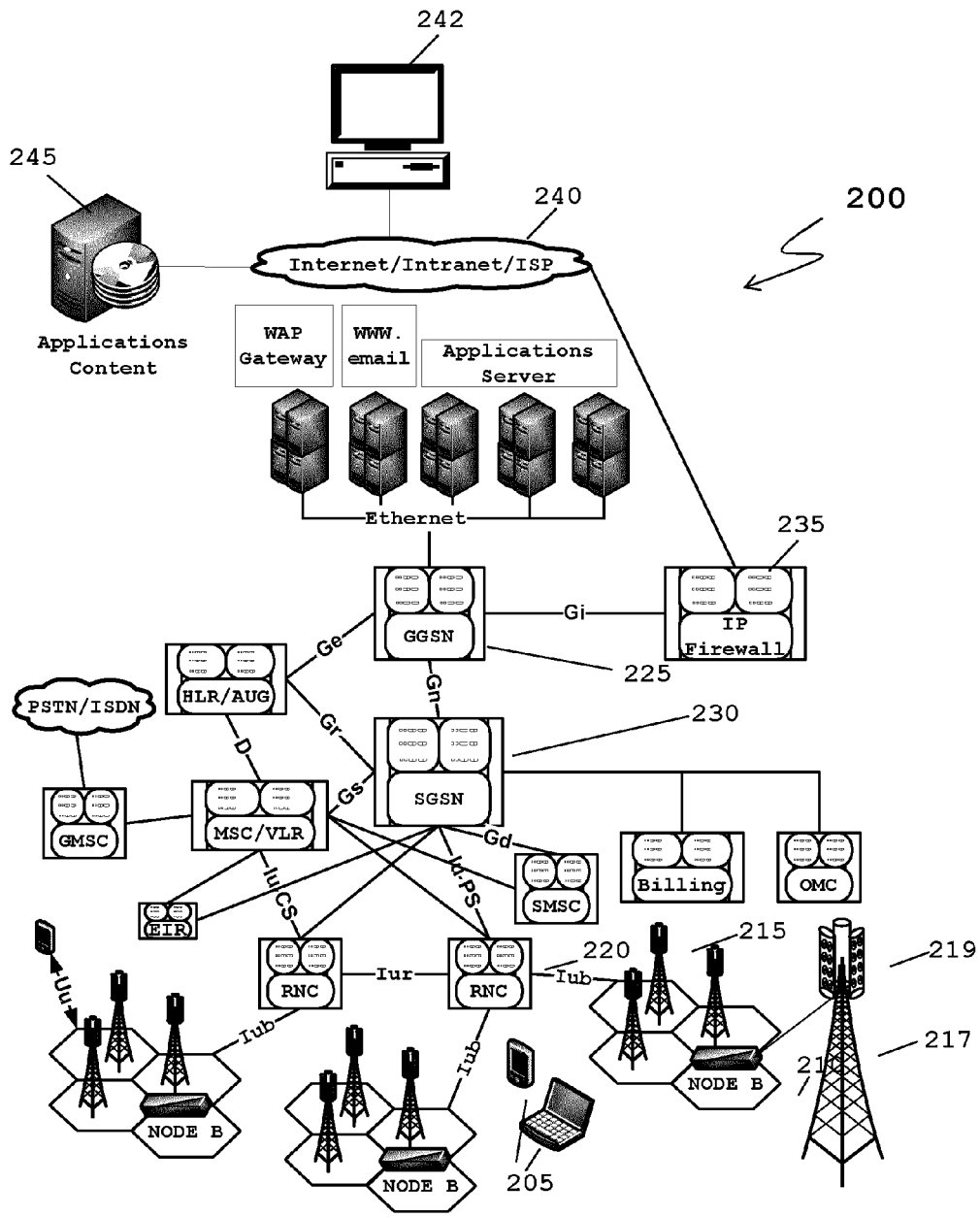
FIG. 2 illustrates an example of a 3GPP cellular communication system adapted in accordance with some example embodiments of the invention.

Referring now to FIG. 2, a cellular-based communication system 200 is shown in outline, in accordance with one embodiment of the invention. In this embodiment, the cellular-based communication system 200 is compliant with, and contains network elements capable of operating over an universal mobile telecommunication system (UMTS™) air-interface or any evolution of said air interface access method.

A plurality of wireless subscriber communication units/terminals (or user equipment (UE) in UMTS™ nomenclature) 205 communicate over radio links with a plurality of base transceiver stations, referred to under UMTS terminology as Node-Bs, 215 supporting communication coverage over a particular communication cell 210. The system 200 comprises many other UEs and Node-Bs, which for clarity purposes are not shown.

The wireless communication system, sometimes referred to as a Network Operator's Network Domain, is connected to an external network 240, for example the Internet. The Network Operator's Network Domain includes:

(i) A core network, namely at least one Gateway General Packet Radio System (GPRS) Support Node (GGSN) 225 and at least one Serving GPRS Support Nodes (SGSN) 230; and (ii) An access network, comprising a UMTS Radio network controller (RNC) 220; and at least one UMTS Node-B 215, where each RNC 220 may control one or more Node-Bs 215.

The GGSN 225 or SGSN 230 is responsible for UMTS interfacing with a Public network, for example a Public Switched Data Network (PSDN) (such as the Internet) 240 or a Public Switched Telephone Network (PSTN). The SGSN 230 performs a routing and tunnelling function for traffic, whilst a GGSN 225 links to external packet networks. Each SGSN 230 provides a gateway to the external network 240. The Operations and Management Centre (OMC) is operably connected to RNCs 220 and Node-Bs 215. The OMC comprises processing functions and logic functionality in order to administer and manage sections of the cellular communication system 200, as is understood by those skilled in the art.

The Node-Bs 215 are connected to external networks, through Radio Network Controller (RNC) stations, including RNC 220 and mobile switching centres (MSCs), such as SGSN 230. A cellular communication system will typically have a large number of such infrastructure elements where, for clarity purposes, only a limited number are shown in FIG. 2.

Each Node-B 215 contains one or more transceiver units and communicates with the rest of the cell-based system infrastructure via an $I_{ub}$ interface, as defined in the UMTS™ specification. Each Node-B 215 is operably coupled to an antenna mast 217 for transmitting and receiving signals to/from remote UEs, where each antenna mast 217 comprises an antenna array 219.

In some examples of the invention, the techniques proposed herein may be applied to other technologies than the described HSPA+ technology. For example, examples of the invention may be applied to a host of air interface standards where MIMO techniques are employed, such as LTE, WiMAX or WiFi. WiFi technologies as used for wireless local area networks (WLAN) may use 802.11n, a MIMO scheme, Likewise variants of WiMax, LTE technology may also support MIMO schemes using OFDM (orthogonal frequency-division multiplexing) technology. WiMax and LTE are wide area network air interface technologies, so called fourth generation (4G) technologies that will predominantly support data services, and in the case of LTE also have the capability of voice services.

In accordance with example embodiments of the invention, a MIMO calibration device is incorporated between the Node-B and the antenna array 219, as described in greater detail below with respect to FIGS. 3-9.

Figure 3:
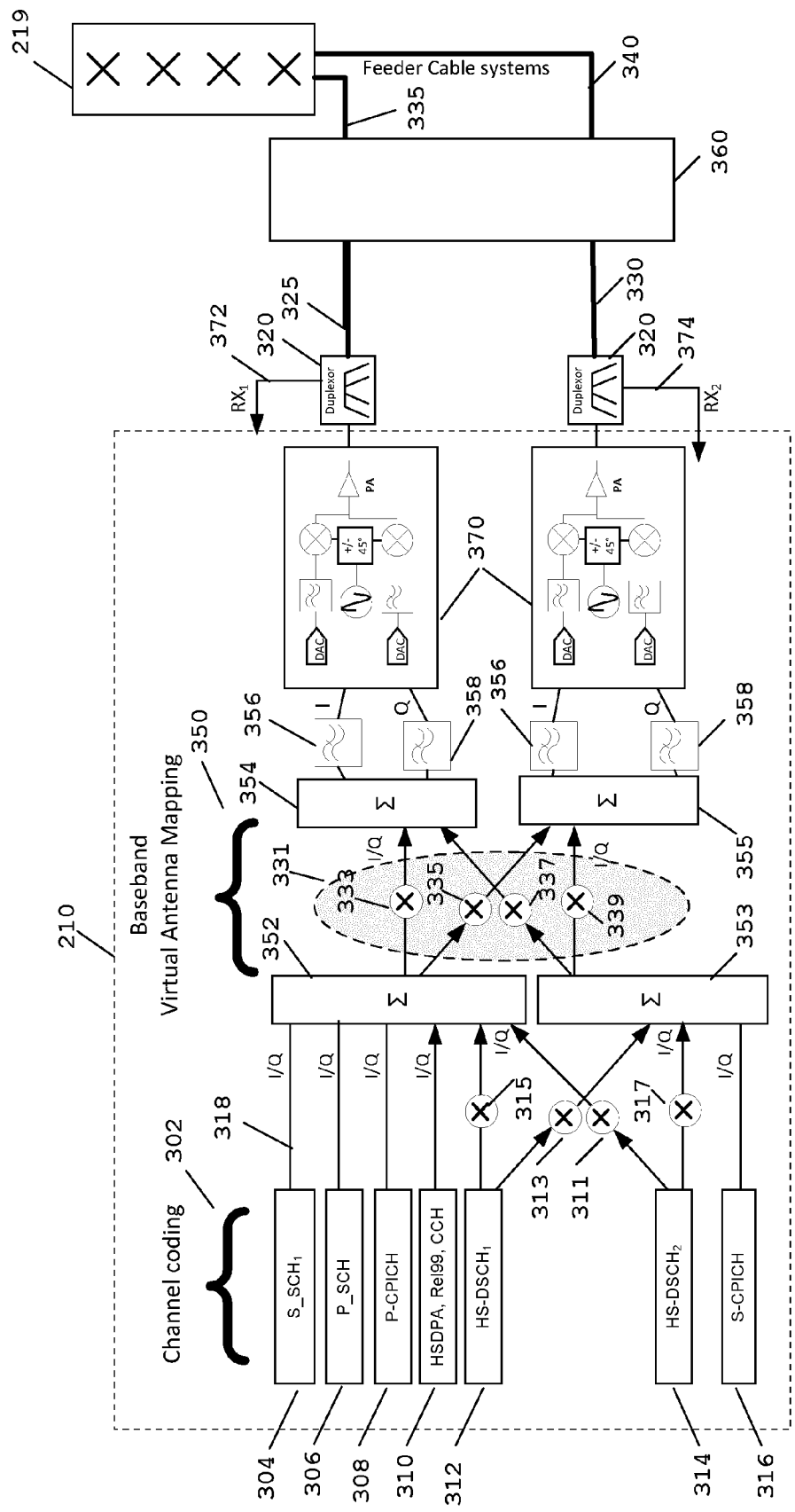
FIG. 3 illustrates a simplified example of a part of a communication architecture comprising a polarisation control device with some detail on mapping of virtual antennae to physical antennae.

Referring now to FIG. 3, and in accordance with example embodiments of the invention, a MIMO calibration device 360 is incorporated between a base station, such as a NodeB or an evolved (e)NodeB 210 and an antenna array 219. The (e)NodeB 210 comprises multiple input/multiple output (MIMO) paths to the antenna array 219, with two MIMO paths illustrated for clarity purposes only. Such a two MIMO path scenario is consistent with a Double Transmit Adaptive Array (DTxAA), as adopted by 3GPP™ for HSPA+ MIMO operation. Each MIMO path comprises a duplexor 320 located at the output of the eNodeB 210. The purpose of the duplexor 320 is to isolate transmit signals from the receive signals, as processed by the eNodeB 210, thereby advantageously allowing receive and transmit to be processed independently in the eNodeB 210. Thus, the MIMO calibration device 360 comprises two ports 'A' and 'B' coupled to first and second MIMO feeds 325, 330, which receive output signals from, or input signals to, duplexors 320. The MIMO calibration device 360 also comprises two ports 'C' and 'D' coupled to a −45° feed 335 and a +45° feed 340, which receives input signals from, or outputs signals to a XPOL antenna array 219.

The eNodeB 210 comprises a plurality of channel coding modules 302, for example a secondary signalling channel (S-SCH) 304, a primary signalling channel (P-SCH) 306, primary and secondary Common Pilot channels (P-CPICH, S-CPICH) 308, 316, a high speed downlink packet access (HSDPA) channels, Rel99 data channels, control channels (CCH) 310 and at least a first and a second high speed downlink signalling channels (HS-DSCH) 312, 314. For the purpose of simplicity, a single pair of HS-DSCH channels is shown. However, it is envisaged that, in some examples, multiple instances of such channels can be accommodated. The HS-DSCH channels have MIMO precoding vectors applied though complex multipliers 311, 313, 315, 317. These complex multipliers 311, 313, 315, 317 have the effect of changing the phase and/or amplitude of a signal as measured at each of the virtual antenna nodes.

The plurality of channel coding modules 302 are coupled, and provide I-Q signals, to input summation modules 352, 353. The summation module outputs are referred to as virtual antenna nodes. As can be appreciated the signal power on the summation module 352 may be much greater than the signal power on the summation module 353, since more channels are incorporated in module 352. In some examples, virtual antenna-to-physical antenna mapping may be performed by utilising cross coupling complex multipliers 333, 335, 337, 339 to approximately equalise the power on the physical antenna ports, as defined as the output of the summation modules 354, 355.

In one example, as shown, the baseband virtual antenna mapping (VAM) module 350 may comprise the complex multipliers 333, 335, 337, 339 and the summation modules 354, 355, The I-Q signals at the output of the summation modules 354, 355 should contain substantially half the power from each of the Virtual antenna nodes at the output of summation modules 353, 352. The relationship of the phase of one of the virtual antenna nodes to each of the physical antenna output nodes, as presented to channel filters 356, 358, should be substantially +90° and 0° respectively. For the other virtual antenna node, the relationship of the phase to each of the physical antenna output nodes, as presented to channel filters 356, 358, should be substantially −90° and 0° respectively. This mapping would allow for orthogonal signals on one of the virtual antenna nodes to be transmitted in LHCP and the alternate virtual antenna node to be transmitted in RHCP if the paths to through the transmission circuits 370, duplexers 320, cables 335, 325 were perfectly matched. Such matching as outlined herein is difficult to achieve. To ensure that the original signals at the virtual antenna node are substantially 90° apart by the time that they reach the antenna array 219 for a desired CP transmission of each of the virtual antenna signals, taking into account phase shifts between the eNodeB 210 and the MIMO calibration device 360 as well as the phase shifts between the MIMO calibration device 360 and the antenna array 219. The complex multipliers 333, 335, 337, 339 used in the virtual antenna mapping, depending upon the mapping vectors used, are capable of amplitude scaling and phase rotation of the signals. Output signals from the summation modules 354, 355 at the output of the baseband virtual antenna mapping (VAM) module 350, are routed digitally in I-Q format signals to respective transmit circuits 370 via low-pass channel filters 356, 358 on the respective I-Q paths. This digital routing to low-pass channel filters 356, 358 and respective transmit circuits 370 could be from a Node B baseband device or circuit to a remote radio head device network installation using for example an OBSAI RP3 01 or a CPRI™ interface. Thus, as illustrated, a DTxAA scheme using two transmitter paths is supported in the architecture of FIG. 3, which in some examples provides digital I-Q modification signals from the MIMO calibration device 360 to a Virtual antenna to physical antenna mapping module 350. This mapping module introduces the polarisation mapping method used by the MIMO calibration device 360 for mapping the signals.

In some examples, DTxAA VAM functionality may also be obtained by placing a 3 dB hybrid combiner on the transmitter path of RF signals, formed from up-converted virtual antenna node signals described herein. Couplers and hybrid couplers are devices in which two transmission lines pass close enough to each other for energy propagating on one line/path to radiatively or conductively couple to the other line/path. A 3 dB 90° or 180° hybrid coupler splits an input signal into two substantially equal amplitude outputs with either a substantially 90° or 180° phase difference in output signals. A 3 dB hybrid coupler may be constructed as a branch line structure, which can be made for example on a printed circuit board using coupling branches in microstrip or stripline controlled impedance traces. In other examples, other means of producing 3 dB hybrid structures may be used, for example using rat race and Lange constructions.

In this manner, a MIMO calibration device 360 is capable of adjusting RF signals from a base station 210 that are routed to a cross polarised antenna or antenna array 219, such that they are transmitted accurately as LHCP and RHCP signals as defined by the VAM precoding.

In some examples, such a MIMO calibration device 360 may also be placed inside the antenna housing, thereby advantageously negating a need for an extra set of jumper cables, mast head device and installation calibration procedure. In some examples, the installation calibration procedure may be performed in the antenna factory, prior to customer delivery, thereby potentially negating a need to calibrate the cables from the antenna elements to the MIMO calibration device 360 during the on-site installation.

Figure 4:
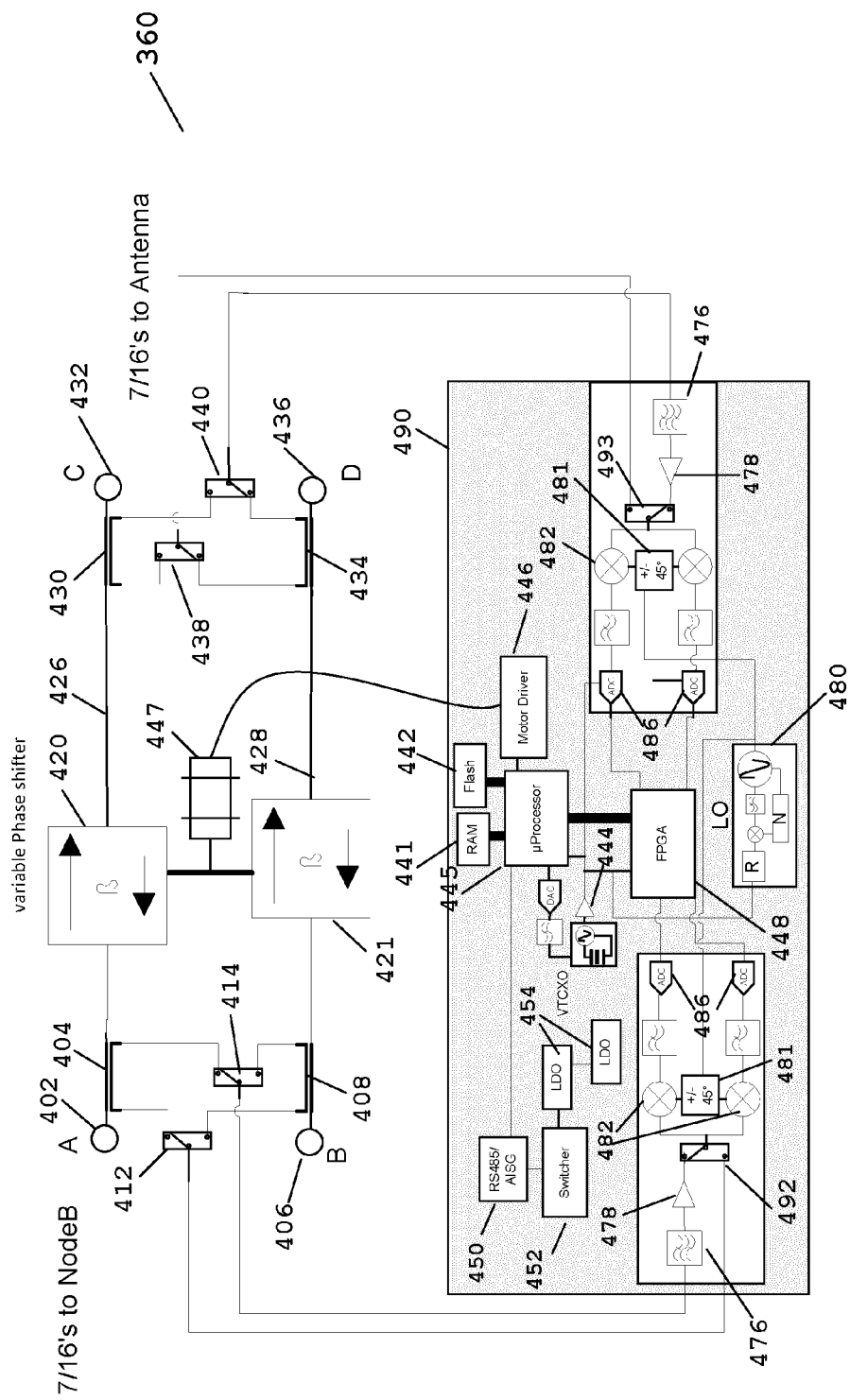
FIG. 4 illustrates a first example of a polarisation control device.

Referring now to FIG. 4, a more detailed example of the MIMO calibration device 360 is illustrated, in accordance with a first exemplary embodiment of the invention. In some example embodiments, the MIMO calibration device 360 comprises one, some or all of the RF circuit elements, as well as the one, some or all of the receiver, baseband processing and control functions or logic elements. In some example embodiments, the MIMO calibration device 360 may only comprise one, some or all of the receiver, baseband processing and control functions or logic elements, configured to be operably coupleable, and provide control signals to, one, some or all of the RF circuit elements, such as phase shift control or control signals to control the operation of one or more of the RF switches. In some example embodiments, one, some, or all, of the receiver, baseband processing and control functions or logic elements may be implemented on one or more integrated circuit(s).

In the example embodiment illustrated in FIG. 4, cross polarised (XPOL) antenna elements that are of an orthogonal polarisation linear type employing both +45° and −45° are used, with respective independent transceiver antenna paths operably coupled to each port of the antenna element. In one example embodiment, the MIMO calibration device 360 may be employed as a network element coupling a base station, such as eNodeB 210 to an antenna arrangement, such as antenna array 219. In one example, the MIMO calibration device 360 may be located in the tower base adjacent to a Node B base station, or at tower top and co-located with a remote radio head connected to the antenna arrangement. In one example the MIMO calibration device 360 may be incorporated in housing with a tower mounted amplifier, where such an amplifier is used for the purpose of amplification of received signals. In one example, the MIMO calibration device 360 includes a processing unit 490. In one example the MIMO calibration device 360 may include a connector to host a processing unit 490; such that the processing unit may be disengaged once signal processing steps are completed.

The MIMO calibration device 360 comprises two ports 'A' 402 and 'B' 406 coupled to first and second MIMO feeds to the eNodeB 210. In MIMO calibration device 360 the two ports 'A' 402 and 'B' 406 are connected to respective directional couplers 404, 408, arranged to couple off a portion of signals appearing on ports 'A' 402 and 'B' 406. The directional couplers 404, 408 are connected to processing unit 490 via first and second single pole double throw switches 412, 414. Similarly, MIMO calibration device 360 comprises two other ports 'C' 432 and 'D' 436 that are connected to respective directional couplers 430, 434, arranged to couple off a portion of signals appearing on output ports 'C' 432 and 'D' 436. The directional couplers 430, 434 are connected to processing unit 490 via third and fourth single pole double throw switches 438, 440. In this manner, the MIMO calibration device 360 is able to receive the coupler sensed signals that are output to (or received from) the antenna arrangement.

Two signal paths couple the two input ports 402, 406 to the two output ports 432, 436 via respective variable phase shifters 420, 421. The 90 degree phase shift between the two paths is controlled within the MIMO calibration device 360 using motor 447, the polarisation control device need only manage the phase mismatch (which may be referred to as a delay) between itself and the antenna or antenna array 219 of FIG. 2. Thus, signals to and from the Node B 210 of FIG. 2 to the MIMO calibration device 360 need not be calibrated or matched.

The processing unit 490 performs down conversion of RF signals as sensed by the couplers 408, 404, 430, 434 and comprises one or a plurality of feedback receivers, with two feedback receivers shown. In the example employing two feedback receivers, each receiver may consist of an optional band-pass filter 476, an optional low noise amplifier (LNA) 478, down-conversion stages 482 arranged to down-convert the respective received signals based to a frequency down-converted signal. Down conversion signals are fed in quadrature format from a local oscillator generation subsystem 480, 481. The respective quadrature down-converted amplified received signals are input to respective low-pass filters and thereafter to respective analogue-to-digital converters (ADCs) 486 to transform the quadrature down-converted received signal to a digital form. The outputs from the respective ADCs 486 are input to field programmable gate array (FPGA) 448. In one example, FPGA 448 is arranged to perform filtering, decimation and Direct Current voltage Offset Correction (DCOC) on the received signals under different mode of operation. DCOC may be used to allow accurate measurements of signals to be achieved by removing a DC component.

The FPGA 448 and feedback receivers receive a clock signal generated by clock circuitry 444. The FPGA 448 is operably coupled to a microprocessor 445, which in this example is operably coupled to a random access memory (RAM) 441, which may be used for storage space during the execution of calibration algorithms, and (non-volatile) flash memory 442 (used for storing data whilst the memory is un-powered). Thus, in this example, the flash memory 442 may be used for the storage of computer code for the execution of the algorithms, as well as for storing the status and results of calibrations already run, and in some examples storing details of the last motor position. Memory modules 441 442 may be in a form of modules that can be removed from the processing module 490. In some examples, such memory modules may be in the form of USB (universal serial bus) memory, SD (secure digital) memory cards, DDR (double data rate) SDRAM (synchronous dynamic random access memory) modules. Memory modules may also be in the form of standalone ICs or embedded memory in other IC functions, such as microprocessor and/or field programmable gate array FPGA modules, Memory modules in one example embodiment may be used to store data samples received from the ADCs that are processed at a different time to the time the samples are acquired, thereby supporting off-line or non-real time processing.

In some example embodiments, the clock function may also be used to set up real-time clock functions within the microprocessor 445. These clock functions may be bussed to schedule calibration events or to track the time-based boundaries of the transmitted signals.

The micro-processor 445 performs a variety of operational functions, including by way of example, digital signal processor (DSP) related algorithmic solutions, motor drive control and event scheduling and communications via the serial Antenna Interface Standards Group (AISG™) interface. The AISG™ interface standard specifies, for example, the connector, voltage levels and communications protocol that is used for powering and controlling equipment and tower top components in cellular infrastructure deployments, including, for example, Remote Electrical Tilt (RET) antennae. AISG™ allows electrical power to be provided over the connector in a form of 10V to 30V Direct Current (DC) supply to power for the processing unit 490. The micro-processor 445 also provides control of a RS485-based communications interface used as the signalling means for communicating with a remote AISG™ master device. Such an AISG™ master device is often included as part of the Node B, such that the Node B is able to accept controls from an operations and management centre (OMC). It will be appreciated that in alternative example embodiments, other interfaces may be employed.

In one example, the FPGA 448 and micro-processor 445 cooperate to determine a phase difference between signals on ports 'C' 432 and 'D' 436, as detected by the antenna arrangement and as received in the MIMO calibration device 360, thereby taking into account mismatches in electrical length of associated feed network. Furthermore, the difference between signals on port 'C' 432 and port 'D' 436, as sourced from the eNodeB 210 and as received in the MIMO calibration device 360, thereby take into account phase mismatches in the transmitter or cable feed system. In response to the combined determined phase relationship between the antenna arrangement and the MIMO calibration device 360 and the eNodeB 210 and the MIMO calibration device 360, the micro-processor 445 determines a phase shifter position corresponding to a motor movement by configuring the motor driver 446 actuating the motor to automatically adjust one or both of the respective phase shift(s) 'β' of the variable phase shifters 420, 421.

Motor driver circuits are used to excite the armatures of the motor 447, and in some examples include high current switches in a H-bridge configuration. The motor driver 446 may also include an ability to change direction of the motor by changing a direction of the current in the armatures. In an example case where stepper motors are used, different modes of operation may be employed such as micro-step modes, where the current is modulated to generate steps smaller than a full step and/or where different coil winding may be selected.

For example, if the signal at port 'A' 402 is selected, then the algorithm run by microprocessor 445 compares the phase of the signal at port 'A' 402 with the signal at port 'C' 432 and compares the signal or phase of the signal at port 'A' 402 with the signal or phase of the signal at port 'D' 436. The microprocessor 445 is then able to determine a difference between both results, for example after applying a conversion from Cartesian I-Q format to polar magnitude phase using a COordinate Rotation DIgital Computer (CORDIC) Arctan function. An ArcTan function is used to convert Cartesian 'I' and 'Q' values to a phase value and may be efficiently implemented using a CORDIC algorithm. In this manner, microprocessor 445 is able to calculate a phase mismatch between a signal at port 'C' 432 and the signal at port 'D' 436. Thereafter, microprocessor 445 is able to use this information to determine a phase mismatch compensation to be applied to one or both of the variable phase shifters 420, 421 via accurate control of the operation of the motor 447.

Advantageously, the variable phase shifter's 420, 421 outputs can be calibrated in a manner that facilitates a closed loop control of phase shifts. In addition, by applying a phase adjustment on one or more of the antenna feed paths, it is possible for the microprocessor 445 to optimise polarisation at the output of the antenna to include at least one from a group consisting of: LP, CP and elliptical polarisation.

In one example, the directional couplers 408, 404, 430, 434 have two coupled ports for sensing signals propagating in either direction through the MIMO calibration device 360. The receivers can be configured to receive signals on a direction between the Node B and the antenna or from the antenna to the Node B, as facilitated by single pole double throw switches 412, 414, 438 and 440 that are controlled (not shown) to select the receiver sensing paths.

In one example, the signal processing functions/operations in the FPGA 448 and microprocessor 445 can determine from such received signals as sourced from the output of the eNodeB, as can be observed at port 'D' 436 and port 'C' 432. In one example, the signature pilot signals received signals, as sensed on port 'D' 436 and port 'C' 432, can be compared with an idealised reference and can be used to make a refinement to the setting of one or both of the variable phase shifters 420, 421 in order to generate a signal that is substantially close to the ideal reference, and thus capable of being referenced.

The term 'pilot signal', for the purposes of calibration in example embodiments employed herein is any signal component or partial signal component that is common to both MIMO feeds. In some examples, this signal component may be defined either apriori or at the time of reception. In some examples, this signal can be present at all times or at schedules events as dictated by an appropriate air interface protocol. As such, HSPA+ channels of the P_CPICH, S_CPICH, S-SCH and P-SCH would qualify as pilot signals. In examples of the invention, a Pilot Signal may also include a tonal signal as is used in some air interface standards, such as GSM (Global System for Mobile Communications) where a SCH (synchronisation channel) is a tonal 67 kHz offset from the carrier centre frequency. Likewise, in standards such as LTE or WiMax that employ OFDM subcarriers are assigned pilot status and are tonal signals present on a subcarrier. Thus, reference to pilot signals within the description and claims is to be interpreted as encompassing all such definitions In one example, the variable phase shifters 420, 421 may be an electromechanical type employing a motor 447 to actuate the phase response. These variable phase shifters 420, 421 may use a transmission line (first path) that is capable of being stretched or contracted relative to the second path, to correspond with a phase response that is required by the MIMO calibration device 360. An electromechanical type phase shifter is used in preference to a phase shifter using solid state devices, as solid state device based phase shifters, such as for example a PIN diode based embodiment would result in much greater inter-modulation product generation, such that it that would affect other users of the spectrum and possibly violate spectral emission requirements of the base station. It will be appreciated by skilled artisans that alternate embodiments of phase shifters will not alter the teachings of the invention described herein. Furthermore, in the embodiments described herein the phase shifter may comprise an adjustment on both signals routed to ports 'C' 432 and 'D' 436 of MIMO calibration device 360. In an alternative example, the adjustments may be performed on only one of either of the signals routed to ports 'C' 432 and 'D' 436 of MIMO calibration device 360.

In one example, an integrated circuit for the MIMO calibration device may be used to perform the processing operations for compensating phase mismatch between base station 210 and antenna arrangement 219. In this context, the integrated circuit may comprise one or more receivers for example processing units 490 arranged to receive and process at least one down-converted radio frequency signal routed on at least two paths between the base station 210 and antenna arrangement 219. The integrated circuit may comprise processor 445 arranged to determine a phase difference of the at least one down-converted radio frequency signal between the at least two paths; and arranged to adjust a phase setting of a phase shifter 420 to be applied to at least one radio frequency signal on at least one of the at least two paths.

In operation, in one example, the MIMO calibration device 360 is able to convert two MIMO transceiver paths to be transmitted in a CP mode of operation. In one example, the MIMO calibration device 360 is also capable of determining the mismatch on the feeder cables between the MIMO calibration device 360 and the elements of antenna array (for example antenna array 219 of FIG. 3).

In one example, a calibration is performed to measure the (cable) feed network phase difference between orthogonal ports of the antenna array to the MIMO calibration device 360. Noting that the cable mismatch between antenna feeds is unknown at this point, the MIMO calibration device 360 may be configured to arrange for the receiver connected to input ports 'A' 402 or port 'B' 406 to function as a reference for the calibration of the antenna to the MIMO calibration device 360. This method may also be used in a second example calibration where a receiver may also be used as a reference for determination of phase error from the Node-B base band to the MIMO calibration device 360. The algorithms described herein with respect to the examples in FIG. 7 to 9 aim to reduce, negate or eliminate the unknown phase error of the associated receiver by taking two measurements and subtracting a difference between the two measurements. Advantageously, this subtraction of measurement values will then largely reduce, negate or eliminate the need for precise matching of the active receiver circuits.

In some example embodiments, this technique may also be used when measuring the phase mismatch of feeds from the eNodeB 210 to the MIMO calibration device 360 in that the path selected, either port 'A' 402 or port 'B' 406 can be used as reference to measurements taken on port C 432 and port D 436. A difference in the measurements between port 'A' to port 'C' and port 'A' to port 'D' renders the mismatch of receiver calibrations to be negated.

In some examples, the MIMO calibration device 360 has a number of operational modes. A first operational mode may involve an installation calibration mode, which may be used to determine whether any cable feed phase mismatch exists between the MIMO calibration device 360 and the antenna arrangement, which may include running a calibration algorithm to determine a phase of both incoming signals and thereby determine any cable feed mismatch between the two paths/signals.

A second operational mode may be an in-service calibration mode. In this second operational mode the MIMO calibration device 360 may be configured to determine the phase relationship of at least one pilot signal that is common to both MIMO feeds from the eNodeB 210 on port 'C' 432 and port 'D' 436. The accuracy of the variable phase shifter 420, 421 in the MIMO calibration device 360 can also be observed in such an operational mode.

A third operational mode may involve a phase adjustment operational mode, which may employ performing a phase adjustment of the variable phase shifter to a correct position, using phase adjustment values determined during the installation and or in-service calibration mode. The second operational mode may involve motor control, to precisely control a motor stop position to effect a desired phase change and thereby a desired phase response of the variable phase shifter 420, 421.

Once calibration is complete, the MIMO calibration device 360 may enter a static 'standby mode' allowing accurate CP signals to be generated by the MIMO calibration device 360. This static 'standby mode' is a low power mode of operation where the device is still powered. In one example, all circuits may be switched off in static 'standby mode, other than those for monitoring communication interrupts over the AISG™ interface.

In another example the real-time clock function may schedule interrupts on the microprocessor to start a calibration routine.

In a further example, an installation calibration may be performed using two frequencies (instead of the above example of one frequency) to measure the (cable) feed network phase difference between orthogonal ports of the antenna array to the MIMO calibration device 360. This calibration process may determine a second relative phase response of the operable couplable network feeds from the MIMO antenna calibration device to the antenna elements of orthogonal polarisation of the antenna arrangement. For example, if the signal at port 'A' 402 is selected, then the algorithm run by microprocessor 445 compares the phase of the signal at port 'A' 402 with the signal at port 'C' 432 for a first of the two frequencies and compares the signal at port 'A' 402 with the signal at port 'D' 436 for the same first frequency. The microprocessor 445 is then able to determine a difference between both results, for example after applying data conversion using a CORDIC Arctan function for that first frequency. For this two frequency example, if the signal at port 'A' 402 is selected again using a second frequency, then the algorithm run by microprocessor 445 compares the phase of the signal at port 'A' 402 with the signal at port 'C' 432 for the second of the two frequencies and compares the signal at port 'A' 402 with the signal at port 'D' 436 for the same second frequency. Thereafter, microprocessor 445 is able to determine a phase difference between both results, for example after data conversion using a CORDIC Arctan function for the second frequency.

Figure 5:
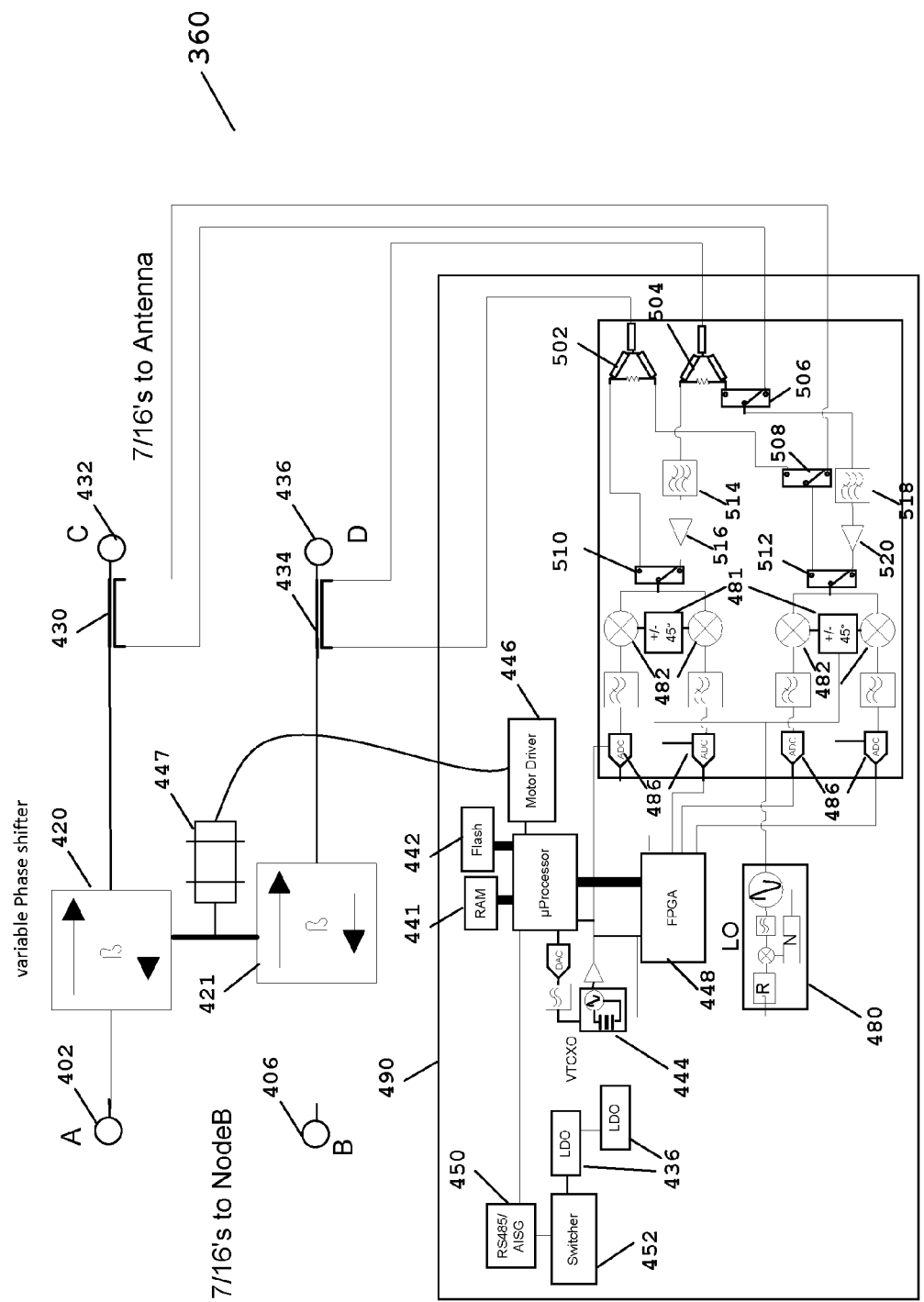
FIG. 5 illustrates a second example of a polarisation control device.

Similarly, in some example embodiments related to the determination of the installation calibration described in FIG. 5, a determination of a phase response of the signals propagating to or from the antenna arrangement can be determined as the signal coupled through splitter 503 can be used as a reference. In such an example, a difference of signals received on port 'D' can be obtained and this can be compared as received through both receivers by the selection of switch 506. This result (D-D') will allow the offset in the receiver chain to be determined. and subsequently substantially eliminated from the phase result of the signal present on ports 'C' and 'D'. The determination of phase relationship when the switch 508 is selected may allow signals present at port 'C' 432 to be processed, and thus a port 'D'-port 'C' result may be processed. The D-D' result first computed may be subtracted, since this is the error associated with the processing paths in processing module 490.

In this example, the phase difference result between the ports at the two different frequencies can be used to algorithmically determine the desired phase compensation term to be employed across a wide range of frequencies for the phase component between the MIMO calibration device 360 and the antenna arrangement. This may be achieved by using results obtained for the different frequencies and, for example, linearly extrapolating the phase response as a function of operating frequency of the device. Advantageously, such a two frequency example allows for phase response to be compensated over a wider bandwidth than the single frequency example. In addition, the two frequency example can also be used to determine the phase response across multiple wavelengths of mismatch. In one example, the installation calibration program may be initiated on a first power up in the field as part of the installation procedure.

In one example, a two-tone signal source may be transmitted in the far-field of a known polarisation to the antenna being installed.

In one example of an installation calibration, a VP signal may be used for a +/−45° XPOL antenna arrangement, thereby ensuring that a relative phase mismatch can be determined.

As illustrated with respect to FIG. 4, four-port directional couplers 404, 408, 430, 434, may be employed in the MIMO calibration device 360 at each port. These four-port directional couplers 404, 408, 430, 434, provide signals to be fed back to the respective receivers. When running an installation calibration program, a respective receiver path through the LNAs is selected, with the LNA connected to the coupler port for signal propagation in the direction from the antenna to the Node B for the purposes of installation calibration.

In one example, two carrier frequencies may be used for installation calibration, where these two carrier frequencies may be radiated to the antenna array from a known polarised antenna for the purpose of installation calibration. As mentioned, in one example, the known polarised antenna may be placed in the far-field of the antenna array. The far-field region is the region outside the near-field region, where the angular field distribution is essentially independent of distance from the source. In the far field, the shape of the antenna pattern is independent of distance. If the source has a maximum overall dimension D (maximum perpendicular size of antenna in the case of most cellular deployed antenna arrays) that is relatively large compared to the wavelength λ, the far-field region is commonly taken to exist at distances from the source, greater than Fresnel parameter $S=D^2/(4\lambda)$.

In other examples, used in installation calibration, an apparatus that is capable of sending a known polarised signal for the purpose of installation calibration to the antenna array under test may be used, such as a waveguide probe or a leaky feeder. In further examples, near-field sources can also be used if they can produce a plane-wave stimuli to the antenna under installation calibration. The near field is that part of the radiated field that is below distances shorter than the Fresnel parameter $S=D^2/(4\lambda)$.

In this manner, microprocessor 445 is able to calculate a phase mismatch between a signal at port 'C' 432 and the signal at port 'D' 436 as propagated from the antenna arrangement. The calculated phase mismatch may be used thereafter with the in-service calibration to determine a phase mismatch compensation to be applied to the variable phase shifter ('β') 420 via accurate control of the operation of the motor 447. Advantageously, the variable phase shifter 420 output can be calibrated in a manner that facilitates a closed loop control of phase shifts. In addition, by applying a phase adjustment on one or more of the antenna feed paths, it may be possible for the microprocessor 445 to optimise polarisation at the output of the antenna to include at least one from a group consisting of: LP, CP and elliptical polarisation.

Referring now to FIG. 5, a more detailed example of an alternative MIMO calibration device 360 is illustrated, in accordance with a second exemplary embodiment of the invention. In this second exemplary embodiment of the invention, input couplers on port 'A' and port 'B', when compared to the first exemplary embodiment of FIG. 4, are removed. Thus, one of the receivers is also removed. In this second exemplary embodiment of the invention, the functional operation of a majority of the components is the same as that for FIG. 4, so will not be replicated here for the sake of simplicity.

In the second exemplary embodiment of the invention, the phase mismatch due to the feedback receiver paths can again be reduced, negated or eliminated as a difference of the measurements taken.

The signals detected on coupler 434 coupled to port 'D' of the MIMO calibration device 360 are amplitude split with power divider 502, 504. This will result in a 3 dB degradation of signal power, as detected from this port. This will not impact the performance of the algorithms, as the splitters 502, 504 and the single pole double throw switches 506, 508 are preferably factory aligned to eliminate errors from the final result. The impact of the phase offset between the active component elements of the receivers may be reduced or negated as the calibration sequence will compare the phase of the signal at port 'D' with a power-divided version of the signal coupled off coupler 434 and the signal measured from coupler 430 from port 'C. In one example, the calibration sequence may then compare the value of both divided signals off coupler 434 from port 'D' and D". Such a result indicates the phase mismatch of the receiver paths, thereby allowing the phase mismatch to be reduced or eliminated from the result of the phase measured between port 'C' and port 'D'.

Figure 6:
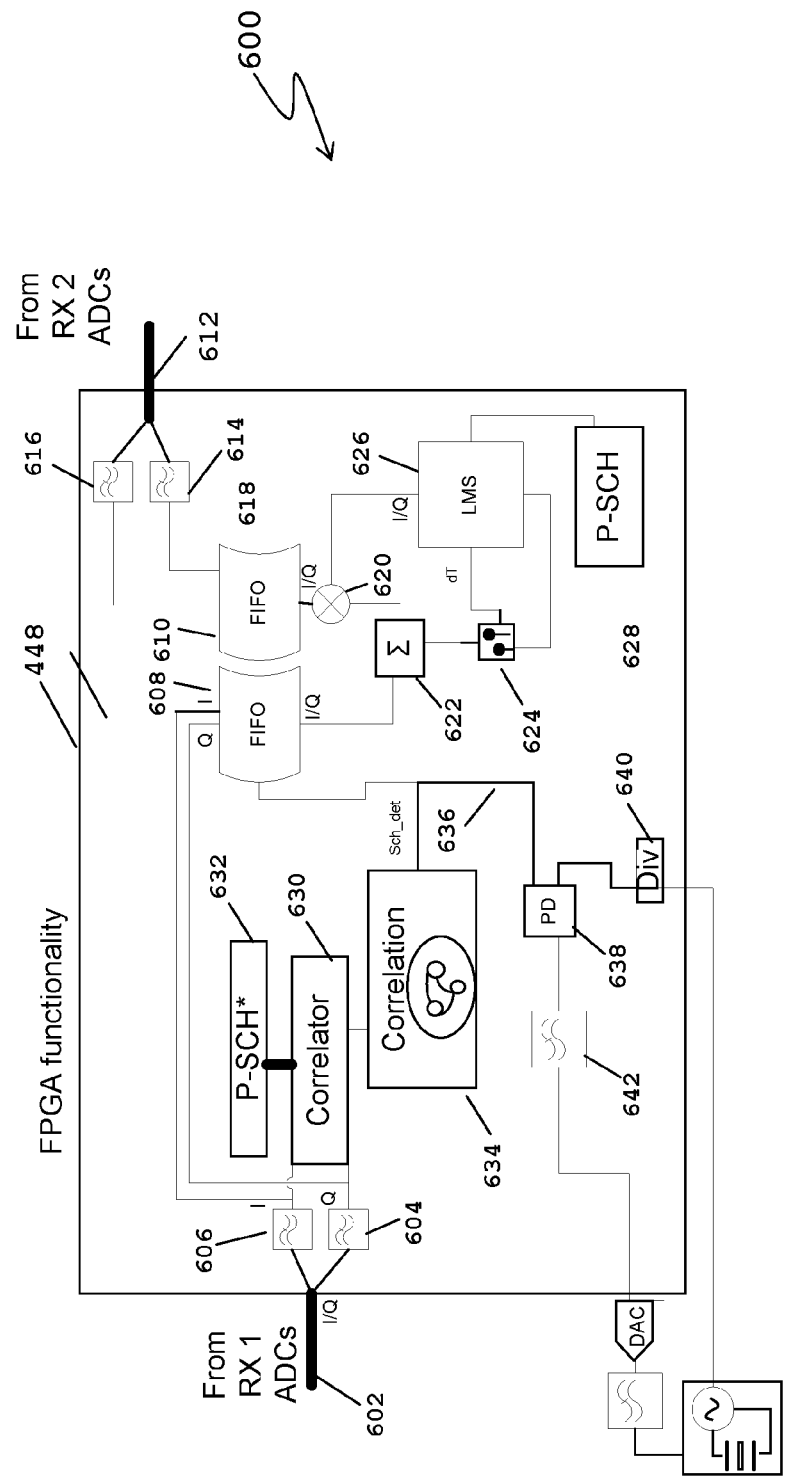
FIG. 6 illustrates an example of a functional block diagram of a field programmable gate array (FPGA) configured to support detection of the phase difference of MIMO feeds containing HSPA+ signals.

Referring now to FIG. 6, an example of a functional block diagram of a field programmable gate array (FPGA) 448, configured to support detection of the phase difference of MIMO feeds containing HSPA+ signals, is illustrated. In this example, only the primary signalling channel (P_SCH)

decoding is employed by the MIMO calibration device/polarisation control device. In one example, the P-SCH may be used since this channel is not spread using CDMA techniques, as the P-SCH is transmitted to define time-slot boundaries and, thus, is not available at all time. Indeed, the P-SCH will be present only for 256 chips of a 2560 chip time frame. In one example, the FPGA 448 comprises filters 604, 606, 614 and 616 for channel filtering and down sampling the incoming data feeds from the analogue-to-digital converters (ADCs). One of the receive paths has I-Q data samples input to correlator, 630. The incoming I-Q signal is fed to the correlator 630 and, with the assistance of the correlator state machine detection module 634, determines a correlative peak corresponding to the P-SCH signal detection. The complex conjugate of the P-SCH signal 632 is fed to the correlator 630, where its value is multiplied on subsequent samples. The purpose of the correlator 630 and the correlator state machine detection 634 is to utilise the filtered down-converted samples from the ADC, say ADC 486 from FIG. 4 or FIG. 5, in order to determine frame/slot synchronisation of the WCDMA/HSPA+ signal transmitted. In one example, for a HSPA+/WCDMA signal, the synchronisation detection pulse will be present every 1.5 kHz (3.84 MHz/2560). The internal clock of the MIMO calibration device 360 is frequency locked to this source using voltage controlled temperature controlled crystal oscillator (VCTCXO). The VCTCXO supports an automatic frequency control (AFC) tracking loop having a low-pass filter 642, a phase differentiator 638 and a divider 640. The correlator 630 can be used because the P-SCH is not spread like other CDMA channels, and as such extraction of the required symbols can be performed using this method only.

The determination of resultant phase accuracy of the respective input ports of the MIMO calibration device 360 of FIG. 4 or FIG. 5 has been shown to be a function of the frequency error associated with the sampling clock. A frequency or phase locked loop is employed to correct the correlation pulse with that of the MIMO calibration device 360. A P-SCH signal detection flag 636 is output to the phase locked loop (PLL) and a first, first-in-first out (FIFO) logic modules 608, 610 to indicate a start of a sample fill operation. The 256 chip duration of samples 602, 612 captured in the two FIFOs 608, 618, one from each receiver may be interpreted as the data corresponding to the duration of the P-SCH slot in the WCDMA frame.

The P-SCH information is contained in both antenna line feeds and should be 90° out of phase in a perfectly matched system.

The P-SCH captured from both receivers will be compared using for example an adaptive filter technique, as shown with least means square (LMS) circuit 620, 622, 624, 626. The result of the convergence of the adaptive filter would be the phase, amplitude difference of the two signals. In an alternative example, a latency value may also be computed. An adaptive filter algorithm, such as an LMS, can compute the difference in phase, amplitude and optionally latency between the P-SCH as presented as digitised samples from the receiver's ADC output data paths 602, 612. In one example, the samples corresponding to the P-SCH transmission time on the MIMO feeds are stored in the FIFOs 608, 610.

The adaptive filter is serially fed the P-SCH reference signal 628 in order to align with samples as they would arrive in sequence. The LMS may update an I-Q output word, which may be used by complex multiplier 620. The LMS algorithm adapts until the P-SCH reference 628 and the output of the optional delay line 624 are equal, which corresponds to the time when both the P-SCH and the fed back signal are equal. The filter output, namely the I-Q word, corresponds to a phase (and amplitude) scaling of the data stored in FIFO 610, such that it is substantially equal to the value stored in FIFO 608.

This update of the I-Q value can then be deemed to be the Cartesian form of the I-Q scaling of signals, in order to make the P-SCH present in FIFO 610 equal to the value stored in FIFO 608. This sequence can be repeated with new values loaded to the FIFOs 608, 610 when the new P-SCH detection occurs. The resultant steady state value at the output of the LMS adaptive filter value may be stored and the process may be repeated for another receiver path pair.

In one example, the determination of Node B carrier frequency of a desired polarisation may be made in a number of ways, which include, for example, programming over the AISG™ interface of information pertaining to the channel frequency, or by means of a frequency channel scan result to determine powers above a threshold level in order to detect transmit frequencies of the Node B as detected through the directional coupler (feedback) ports 430, 434, 408 or 404. Once a desired frequency is known in step 634 the processor may trigger a movement of the variable phase shifter 420 of FIG. 4, if desired and in step 636, based on the calculation determined in step 632.

In some example embodiments, a scanner function may be configured as an operational mode of the processing module 490, which sequentially processes a coupled amount of predefined spectrum usually a channel bandwidth. In the case of HSPA+, this would be a 3.84 MHz channel bandwidth from each of the paths detected through couplers 434 and 430. In some examples, a table of carrier frequency vs. power detected on coupler 430 and power on coupler 434 may be generated for subsequent use. For a MIMO channel to be present there needs to be a power level above a predefined threshold applicable to the class of MIMO transmitter employed on both paths at the same carrier frequency. In such examples, the predefined pilot signal needs to be present on both paths. Using a determination of power threshold rank on each path, together with a presence of a suitable pilot carrier on both paths, the processing module 490 may be capable of determining the presence of one or more MIMO carriers transmitted and thus be able to perform the determination of phase difference of pilot signals present on both paths as a result.

Figure 7:
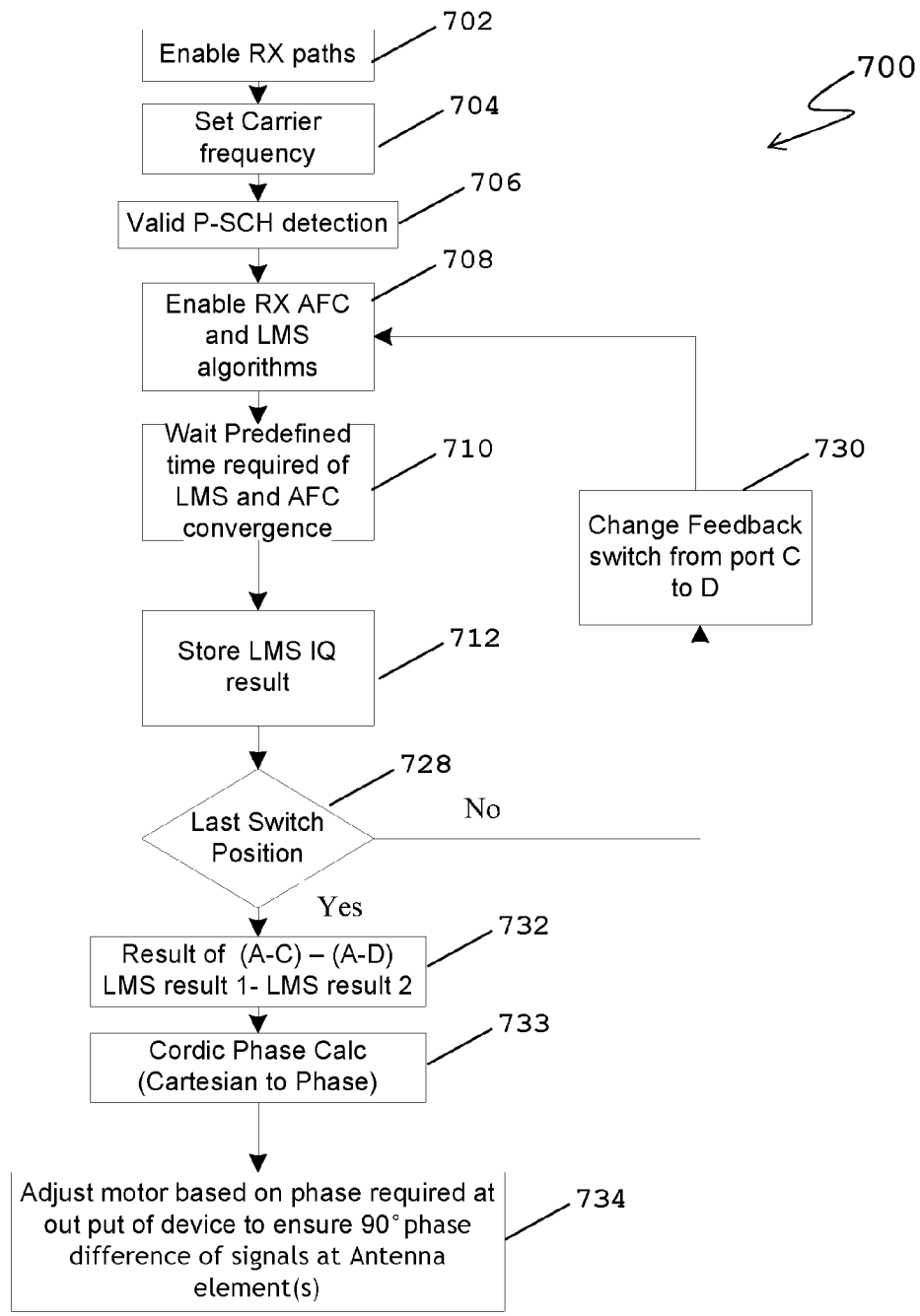
FIG. 7 illustrates a first example of a flowchart for determining a phase offset of respective carriers using a difference of phase from a result of a LMS adaptive filter process employed by the polarisation control device.

A first example algorithm is described in FIG. 7, which proposes to use a difference of phase from a result of the LMS adaptive filter mechanism as described in FIG. 6, in order to determine a phase offset of respective pilot signals as detected on each of the MIMO feeds from the eNodeB to the MIMO calibration device 360. Referring now to FIG. 7, the flowchart 700 to determine a phase offset of respective carriers starts in step 702 with an enabling of the receive (RX) paths. The carrier frequency/(ies) is/are set, as shown in step 704. Next, a determination is made as to whether a valid P-SCH is detected, as shown in step 706. In step 708, receive (RX) automatic frequency control (AFC) and least mean square (LMS) algorithms are enabled. A predefined time is required to allow the respective LMS and AFC algorithms to converge, as shown in step 710. The LMS output I-Q results are then stored in step 712.

A determination is then made as to whether the last switch position of switch 440 of FIG. 4 or switch 508 FIG. 5 of the coupler output sense paths is being used, as shown in step 730. If the determination in step 730 is that the last switch position of the receive paths is not being used, the feedback path is switched from Port 'C' to Port 'D', in step 732, and the process loops back to step 708. However, if the determination in step 730 is that the last switch position of the receive paths is being used, a phase of (A–C)–(A–D), i.e. the LMS result-1 minus LMS result-2 is calculated in step 734. A Cartesian to phase (CORDIC) calculation is then made in step 735. The flowchart 700 then moves on to step 736 where the stepper motor is adjusted based on a phase that is required at the output of the device to ensure 90° phase difference of signals at antenna element(s), and the process ends. The adjustment of the stepper motor, in some examples, may take into account the install calibration result desired phase offset in order to determine the final phase adjustment.

In some examples, measured results may have offsets applied, so as to overcome any process mismatches that may occur in the manufacture of, for example, the couplers 434, 430, or the switches 438, 440. In some examples, such offset parameters may be stored as part of manufacturing process of the MIMO calibration device 360.

Figure 8:
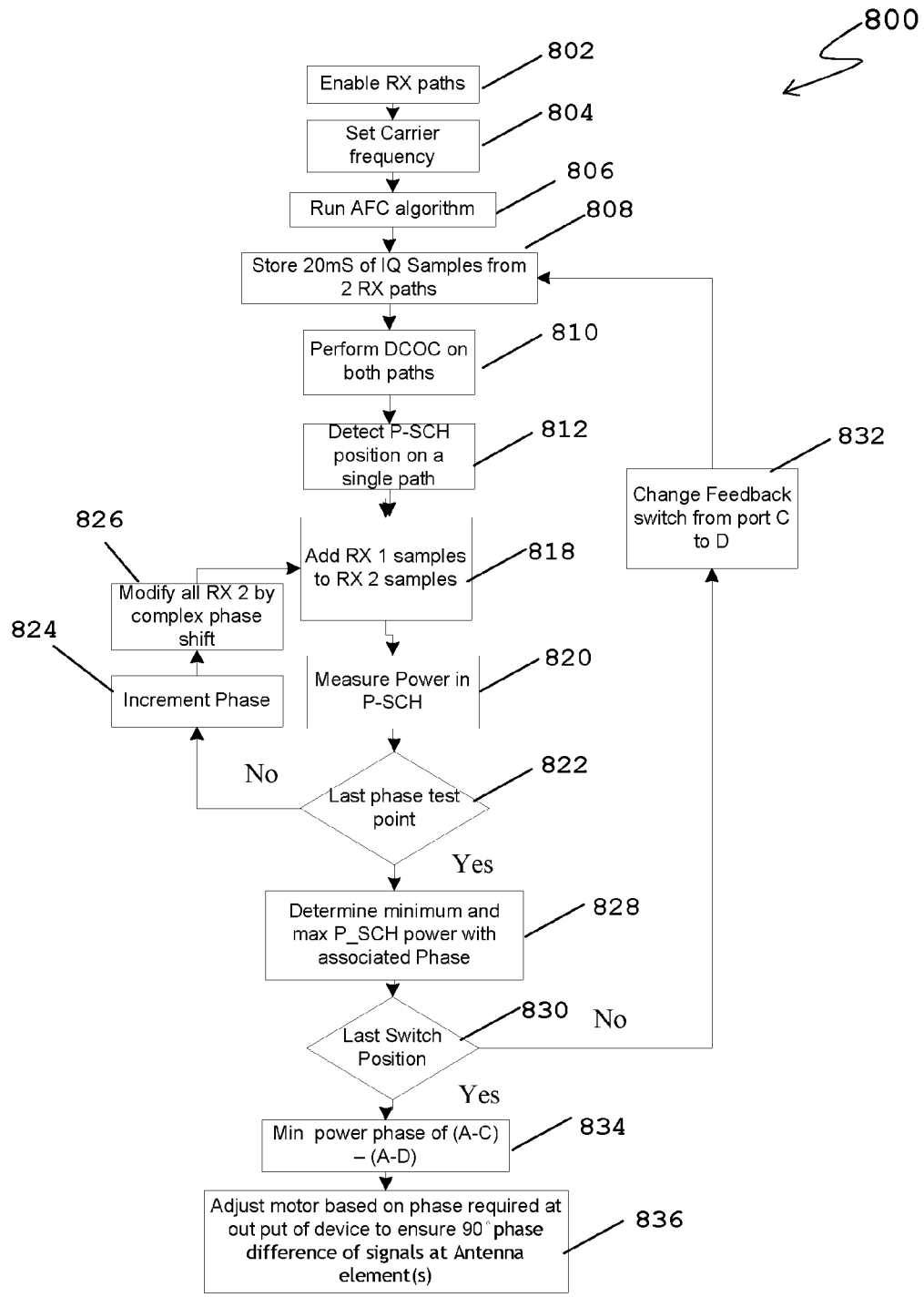
FIG. 8 illustrates a second example of a flowchart for determining a phase offset of respective carriers using detection of a phase offset between respective paths using software methods of successive searching of a local minimum employed by the polarisation control device.

A second example algorithm is described in FIG. 8, which proposes to use detection of a phase offset between respective pilot signals, as detected on each of the MIMO feeds from the eNodeB to the MIMO calibration device 360 using software methods of successive searching of a local minimum to determine a phase offset of respective carriers. Referring now to FIG. 8, the flowchart 800 to determine a phase offset of respective carriers starts in step 802 with an enabling of the receive (RX) paths. The carrier frequency/(ies) is/are set, as shown in step 804. Next, the AFC algorithm is run in step 806. This AFC algorithm could be that defined hereinbefore or an alternative algorithm, for example using a global positioning system (GPS™) receiver to correct a reference clock source. In step 808, a number of IQ samples are stored for each of the respective RX paths, for example 20 msec of IQ samples from the two RX paths as shown are stored. A direct current offset compensation (DCOC) process is performed in step 810 on the respective RX paths. The primary signalling channel (P-SCH) on a single path is detected in step 812.

Next, in step 818, the respective samples from the respective RX paths (in this example RX 1 samples and RX 2 samples) are added. The power in the P-SCH is then measured in step 820. A determination is then made in step 822 as to whether the last phase rotation to be considered has occurred. For example, the algorithm may attempt, in 1° steps, 360 possible phase rotations to test the power of the P-SCH. If the determination in step 822 is that the sample addition and the P-SCH measurement did not relate to the last phase test point, the phase is incremented in step 824. All of a certain receive path's I-Q samples are then modified by a complex value corresponding to a new phase shift in step 826 and the process loops back to step 818 where the respective samples from the respective RX paths (in this example RX 1 samples and RX 2 samples) are added and the loop continues. However, if the determination in step 822 is that the sample addition and the P-SCH measurement did relate to the last phase test point, a determination is made of the minimum and maximum P-SCH power with the associated phase, as shown in step 828. A table of P-SCH power versus phase incremental phase shift value may be generated following a completion of the loop involving steps 818, 820, 822, 824 and 826.

A determination is then made as to whether the last switch position of the coupled paths is being used, as shown in step 830. If the determination in step 830 is that the last switch position of the receive paths is not being used, the feedback path is switched using switch 508 from FIG. 5 or switch 438 from FIG. 4 from Port 'C' to Port 'D', in step 832, and the process loops back to step 808. However, if the determination in step 830 is that the last switch position of the receive paths is being used, a minimum P-SCH power phase of (A–C)–(A–D) is calculated in step 834. A minimum P-SCH power level indicates a point at which both P-SCH signals are 180° out of phase. The flowchart 800 then moves on to step 836 where the stepper motor is adjusted based on a phase that is required at the output of the device to ensure 90° phase difference of signals at antenna element(s), and the process ends. The adjustment of the stepper motor, in some examples, may take into account the install calibration result desired phase offset in order to determine the final phase adjustment.

Figure 9:
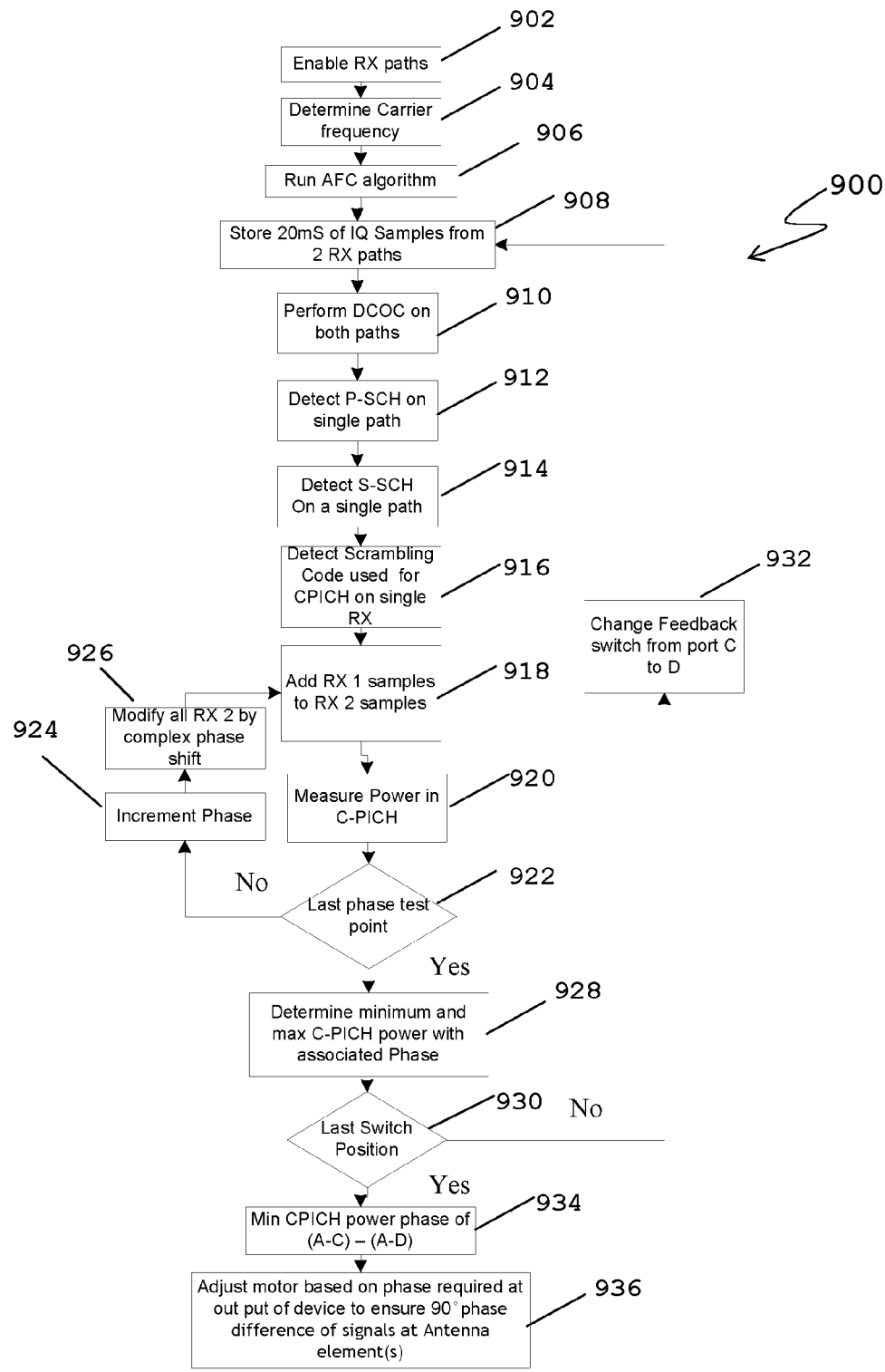
FIG. 9 illustrates a third example of a flowchart for determining a phase offset of respective carriers using a CPICH power level employed by the polarisation control device.

A third example algorithm using pilot signals, as detected on each of the MIMO feeds from the eNodeB to the MIMO calibration device 360, is described in FIG. 9, which proposes to use the CPICH power level to determine a phase offset of MIMO feeds to the antenna arrangement. This technique makes use of an AFC algorithm. In one example, the process speed may be improved using adjustments at chip level rather than frame level to close the loop quicker. This solution requires more computational resources than the solutions proposed in FIG. 7 and FIG. 8. In one example, this third example algorithm may be adopted by the same hardware as shown in the first and second example embodiments.

Referring now to FIG. 9, the flowchart 900 to determine a phase offset of respective carriers starts in step 902 with an enabling of the receive (RX) paths. The carrier frequency/(ies) is/are determined, as shown in step 904. In one example, the carrier frequency/(ies) may be determined be through programming over the AISG interface, or through a process of scanning for a presence of MIMO channels being transmitted. Next, the AFC algorithm is run in step 906. In step 908, a number of IQ samples are stored for each of the respective RX paths, for example 20 msec of IQ samples from the two RX paths as shown are stored. A direct current offset compensation (DCOC) process is performed in step 910 on the respective RX paths. The flowchart 900 then details a detecting of various signalling channels and/or codes on the respective RX paths. For example, in step 912, the primary signalling channel (P-SCH) on a single path is detected. For example, in step 914, the secondary signalling channel (S-SCH) on a single path is detected. For example, in step 916, the scrambling code used for the Common Pilot Channel (CPICH) on a single RX path is detected. This is the sequence used by UE devices to decode base station information.

Next, in step 918, the respective samples from the respective RX paths (in this example RX 1 samples and RX 2 samples) are added. The power in the CPICH is then measured in step 920. A determination is then made in step 922 as to whether the sample addition and the CPICH measurement relates to the last phase test point corresponding to the last trialled phase test position. For example the algorithm may attempt in 1° steps 360 possible phase rotations to test the power of the CPICH. If the determination in step 922 is that the sample addition and the CPICH measurement did not relate to the last phase test point, the phase is incremented in step 924. All of a certain receive path's samples are then modified by complex multiplication resulting in a new desired phase shift of samples from one path, in step 926, and the process loops back to step 918 where the respective samples from the respective RX paths (in this example RX 1 samples and RX 2 samples) are added and the loop continues. However, if the determination in step 922 is that the sample addition and the CPICH measurement did relate to the last phase test point, a determination is made of the minimum and maximum C-PICH power with the associated phase, as shown in step 928. A determination is then made as to whether the last switch position of the coupler paths, using switch 508 from FIG. 5 or switch 438 from FIG. 4, is being used, as shown in step 930. If the determination in step 930 is that the last switch position of the receive paths is not being used, the feedback path is switched from Port 'C' to Port 'D', in step 932, and the process loops back to step 908.

However, if the determination in step 930 is that the last switch position of the receive paths is being used, a minimum CPICH power phase of (A–C) and a minimum CPICH power phase of (A–D) difference is calculated in step 934. This difference is a measure of the phase difference of the pilot signal decoded. The flowchart 900 then moves on to step 936 where the stepper motor is adjusted based on a phase that is required at the output of the device to ensure 90° phase difference of signals at antenna element(s), and the process ends. Again, the adjustment of the stepper motor in some examples may take into account the install calibration result desired phase offset in order to determine the final phase adjustment.

Thus example embodiments of the present invention, may, in some instances, provide an improvement or a potential solution to one or more of the following:

(i) A determination of the phase of pilot signals on incoming MIMO feeds from a Virtual antenna mapping function in the base station baseband or in an in-line 3 dB hybrid coupler.

(ii) A determination of phase mismatch of signals coming from an antenna on respective MIMO feeds, using the above-mentioned installation calibration.

(iii) An adjustment of VAM as needing to be implemented on HSPA+ networks.

(iv) Calibrating a phase shifter to ensure closed loop control of the relative output phase of a MIMO transmitter.

(v) Adjustment of one or more phase shifter(s) as a function of frequency and of cable mismatch taking account of any number of cycle mismatches as part of installation calibration.

(vi) Adjustment of phase feeds to the antenna to optimise polarisation at the output of the antenna to include LP, CP and elliptical polarisation.

Figure 10:
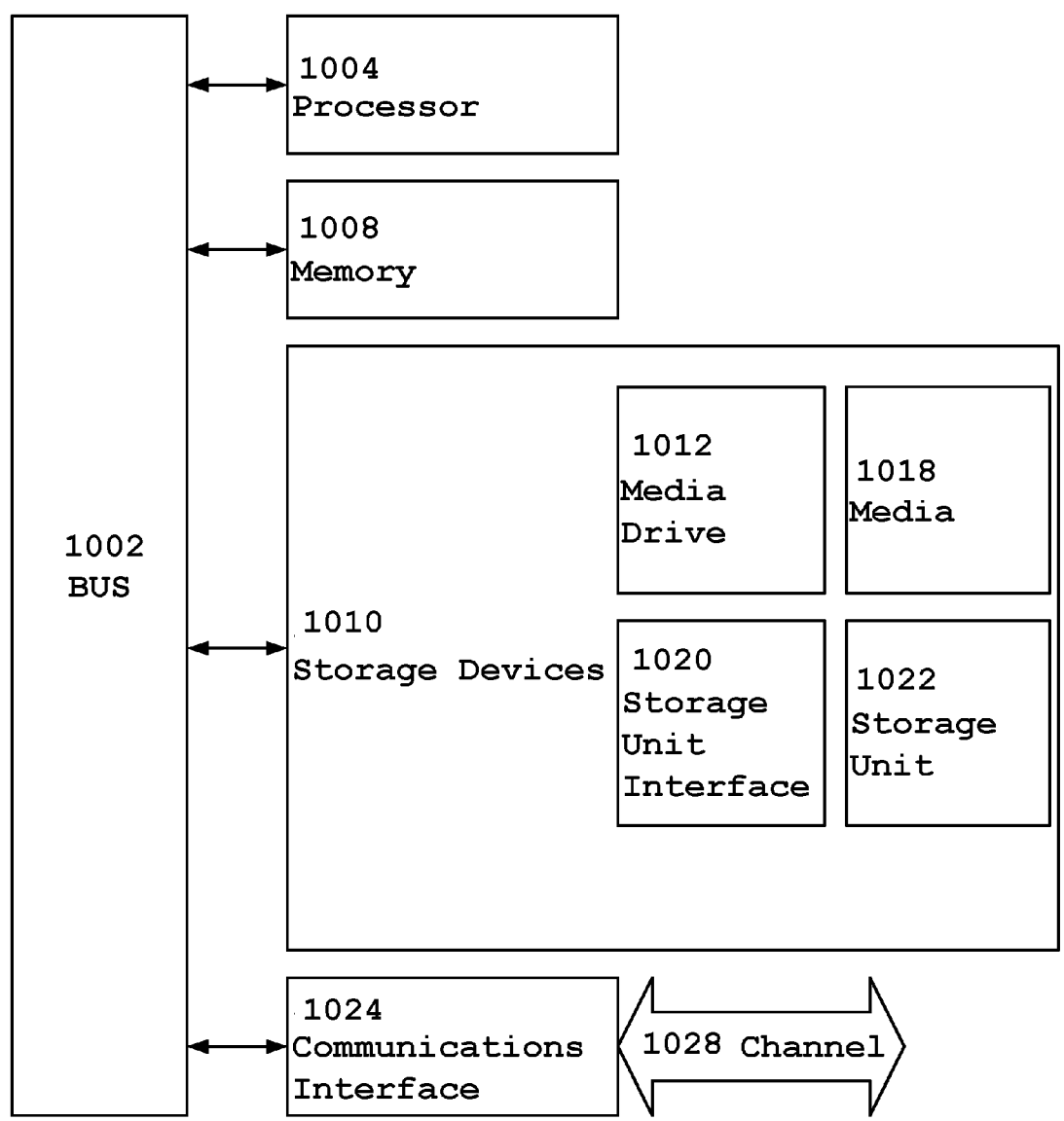
FIG. 10 illustrates a typical computing system that may be employed to implement signal processing functionality in embodiments of the invention.

Referring now to FIG. 10, there is illustrated a typical computing system 1000 that may be employed to implement signal processing functionality in embodiments of the invention. Computing systems of this type may be used in access points and wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control logic. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the radio frequency domain and the baseband processing circuits of the MIMO calibration device 360, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc., do not preclude a plurality.

The invention claimed is:

1. A multiple input multiple output (MIMO) calibration device for calibrating a phase relationship between at least two signals present on at least two radio frequency (RF) paths coupling a wireless communication unit and the MIMO calibration device, wherein the MIMO calibration device is operably coupleable via at least two RF paths between the wireless communication unit and an antenna arrangement; wherein the MIMO calibration device comprises:
   a processing module comprising one or more feedback receivers, the processing module configured to:
      process a coupled amount of at least one first signal from a first path operably coupleable to a first polarization of the antenna arrangement by at least performing a conversion of the at least one first signal using the one or more feedback receivers and determining at least one pilot signal from said at least one converted first signal;
      process a coupled amount of at least one second signal from a second path operably coupleable to at least one second polarization of the antenna arrangement, different to the first polarization, by at least performing a conversion of the at least one second signal using the one or more feedback receivers and determining the at least one pilot signal from said at least one converted second signal, wherein the at least one pilot signal is common to both the at least one first signal and the at least one second signal, and wherein the at least one pilot signal is specified in a communication standard; and
      determine a first phase relationship of the at least one pilot signal between the first signal having the first polarization and the second signal having the second polarization that is different than the first polarization, wherein the at least two RF paths comprise the first path and the second path.

2. The MIMO calibration device of claim 1, wherein the at least one first signal is processed by at least one of a virtual antenna mapping (VAM) module or a 3 dB hybrid combiner.

3. The MIMO calibration device of claim 1, wherein the at least one pilot signal comprises at least of a CPICH signal, a primary signalling channel (P-SCH) signal, a secondary signalling channel (S-SCH) signal, a synchronization signal, a tonal signal, an intermittently transmitted signal, or a high speed downlink packet access signal (HSPA+).

4. The MIMO calibration device of claim 3, wherein the at least one pilot signal is a P-SCH signal and the MIMO calibration device uses at least one of:
   (i) a least mean square (LMS) adaptive filter to determine the phase relationship; or
   (ii) the P-SCH as a code used for automatic frequency correction (AFC) and phase relationship determination.

5. The MIMO control device of claim 1, wherein the processing module is further configured to:
   receive and process a coupled amount of at least one first RF signal; and
   determine at least one second phase relationship of the same pilot signal between the at least two RF paths to the antenna arrangement of the processed coupled amount of the at least one first RF signal.

6. The MIMO calibration device of claim 1, wherein the MIMO calibration device comprises or is operably coupleable to at least one phase shifter module located on at least one path associated with one of the at least two RF paths such that the at least one phase shifter module is arranged to adjust a phase shift based on at least the first phase relationship.

7. The MIMO calibration device of claim 1, wherein the MIMO calibration device is configured to cause transmission of at least the first phase relationship to another network element to control an incoming phase relationship of the at least one pilot signal determined from at least one first signal and at least one second signal on respective polarizations of the antenna arrangement.

8. The MIMO calibration device of claim 1, wherein the at least one first signal is processed by a VAM module, and wherein the VAM module comprises a plurality of cross-coupled complex multipliers and summation modules configured to change a phase of at least one signal operably coupleable to at least one polarization feed to antenna arrangement based on at least the first phase relationship.

9. The MIMO calibration device of claim 1, further comprising a feedback path configured to provide at least the first phase relationship to the wireless communication unit.

10. The MIMO calibration device of claim 1, wherein the feedback receiver is configured to receive a clock signal generated by clock circuitry to track time-based boundaries of said at least one first signal.

11. The MIMO calibration device of claim 1, wherein each of the at least one first signal and the at least one second signal is received at or output to the antenna arrangement.

12. The MIMO calibration device of claim 1, wherein the pilot signal is a tonal signal, and wherein the at least one pilot signal is present in both the at least one first signal and the at least one second signal at the antenna arrangement.

13. An integrated circuit for a multiple input multiple output (MIMO) calibration device for calibrating a phase relationship in real-time between two signal paths, wherein the MIMO calibration device is operably coupleable via at least two radio frequency (RF) paths between a wireless communication unit and an antenna arrangement; wherein the integrated circuit comprises:
a processing module comprising one or more feedback receivers, the processing module configured to:
process a coupled amount of at least one first signal from a first path operably coupleable to a first polarization of the antenna arrangement by at least performing a conversion of the at least one first signal using the one or more feedback receivers and determining at least one pilot signal from said at least one converted first signal;
process a coupled amount of at least one second signal from a second path operably coupleable to at least one second polarization of the antenna arrangement, different to the first polarization, by at least performing a conversion of the at least one second signal using the one or more feedback receivers and determining the at least one pilot signal from said at least one converted second signal, wherein the at least one pilot signal is common to both the at least one first signal and the at least one second signal, and wherein the at least one pilot signal is specified in a communication standard; and
determine a first phase relationship in real-time of the at least one pilot signal between the first signal having the first polarization and the second signal having the second polarization that is different than the first polarization, wherein the at least two RF paths comprise the first path and the second path.

14. The integrated circuit of claim 13, wherein the integrated circuit further comprises a memory included within or coupled to the processing module and configured to store data samples to determine at least the first phase relationship in subsequent processing.

15. The integrated circuit of claim 13, wherein the processing module is arranged to use a first representation of the at least one pilot signal as a reference signal to mitigate mismatch error on a second representation of the at least one pilot signal.

16. The integrated circuit of claim 13, wherein the processing module is further configured to:
determine the first phase relationship in real-time of the at least one pilot signal between the at least two RF paths between a baseband portion of the wireless communication unit and the MIMO calibration device;
determine a second phase relationship between the MIMO calibration device and the antenna arrangement; and
determine at least one composite phase correction value based on the first and second determination.

17. A method for calibrating a phase relationship in real-time between two signal paths by a MIMO calibration device that is operably coupleable via at least two radio frequency (RF) paths between a wireless communication unit and an antenna arrangement, the method comprising:
processing a coupled amount of at least one first signal from a first path operably coupleable to a first polarization of the antenna arrangement by at least performing a conversion of the at least one first signal using one or more feedback receivers and determining at least one pilot signal from said at least one converted first signal, wherein the at least one first signal is received at or output to the antenna arrangement;
processing a coupled amount of at least one second signal from a second path operably coupleable to at least one second polarization of the antenna arrangement, different to the first polarization, by at least performing a conversion of the at least one second signal using the one or more feedback receivers and determining the at least one pilot signal from said at least one converted second signal, wherein the at least one second signal is received at or output to the antenna arrangement, wherein the at least one pilot signal is common to both the at least one first signal and the at least one second signal, and wherein the at least one pilot signal is specified in a communication standard; and
determining a first phase relationship in real-time of the at least one pilot signal between the first signal having the first polarization and the second signal having the second polarization that is different than the first polarization, wherein the at least two RF paths comprise the first path and the second path.

18. A non-transitory tangible computer program product comprising executable program code stored therein for execution on at least one processor for calibrating a phase relationship between two signal paths, the executable program code operable to performing the method of claim 17.

19. The method of claim 17, further comprising applying a real-time clock function at the MIMO calibration device to schedule a calibration event.

20. The method of claim 17, wherein the first path comprises a first connection path between the MIMO calibration device and the antenna arrangement and the second path comprises a second connection path between the MIMO calibration device and the antenna arrangement.

* * * * *